United States Patent
Park

(10) Patent No.: US 8,667,357 B2
(45) Date of Patent: Mar. 4, 2014

(54) METHOD FOR CONDUCTING HARQ WITH A WIRELESS COMMUNICATIONS SYSTEM

(75) Inventor: Hyung Ho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 611 days.

(21) Appl. No.: 12/935,563

(22) PCT Filed: Apr. 2, 2009

(86) PCT No.: PCT/KR2009/001696
§ 371 (c)(1),
(2), (4) Date: Sep. 29, 2010

(87) PCT Pub. No.: WO2009/145474
PCT Pub. Date: Dec. 3, 2009

(65) Prior Publication Data
US 2011/0055652 A1    Mar. 3, 2011

Related U.S. Application Data

(60) Provisional application No. 61/041,890, filed on Apr. 2, 2008.

(51) Int. Cl.
*G08C 25/02* (2006.01)
(52) U.S. Cl.
USPC ........... 714/748; 714/749; 714/750; 714/751; 714/746
(58) Field of Classification Search
None
See application file for complete search history.

(56) References Cited

U.S. PATENT DOCUMENTS

| | | | |
|---|---|---|---|
| 8,270,345 B2* | 9/2012 | Franceschini et al. | 370/328 |
| 2004/0085934 A1 | 5/2004 | Balachandran et al. | |
| 2006/0282740 A1 | 12/2006 | Gu et al. | |
| 2007/0058595 A1 | 3/2007 | Classon et al. | |
| 2007/0260956 A1* | 11/2007 | Terry et al. | 714/748 |
| 2008/0056229 A1* | 3/2008 | Gholmieh et al. | 370/349 |
| 2008/0123684 A1* | 5/2008 | Frederiksen et al. | 370/465 |
| 2009/0033524 A1* | 2/2009 | Tiirola et al. | 341/51 |
| 2009/0257408 A1* | 10/2009 | Zhang et al. | 370/336 |
| 2010/0080152 A1* | 4/2010 | Lindh et al. | 370/280 |
| 2011/0310837 A1* | 12/2011 | Classon et al. | 370/329 |
| 2012/0069796 A1* | 3/2012 | Casaccia et al. | 370/328 |

FOREIGN PATENT DOCUMENTS

EP    1838029 A2    9/2007

* cited by examiner

*Primary Examiner* — Albert Decady
*Assistant Examiner* — Justin R Knapp
(74) *Attorney, Agent, or Firm* — Lee, Hong, Degerman, Kang & Waimey

(57) ABSTRACT

Provided is a method of performing hybrid automatic repeat request (HARQ) of a receiver in a wireless communication system. The method includes: receiving data in a transmission time interval (TTI) unit consisting of a plurality of consecutive subframes; and transmitting acknowledgment (ACK)/non-acknowledgment (NACK) for the received data, wherein the data is received using a plurality of redundancy versions respectively allocated to the plurality of subframes, and the ACK/NACK is transmitted with an interval of a predetermined processing delay from a transmission time of a specific redundancy version among the plurality of redundancy versions.

6 Claims, 32 Drawing Sheets

METHOD FOR CONDUCTING HARQ WITH A WIRELESS COMMUNICATIONS SYSTEM

CROSS-REFERENCE TO RELATED APPLICATIONS

This application is the National Stage filing under 35 U.S.C. 371 of International Application No. PCT/KR2009/001696, filed on Apr. 2, 2009, which claims the benefit of U.S. Provisional Application No. 61/041,890 filed on Apr. 2, 2008, the contents of which are all hereby incorporated by reference herein in their entirety.

BACKGROUND OF THE INVENTION

1. Field of the Invention

The present invention relates to wireless communications, and more particularly, to a method of performing hybrid automatic repeat request (HARQ) in a wireless communication system.

2. Related Art

An error compensation scheme is used to secure communication reliability. Examples of the error compensation scheme include a forward error correction (FEC) scheme and an automatic repeat request (ARQ) scheme. In the FEC scheme, errors in a receiver are corrected by attaching an extra error correction code to information bits. In the ARQ scheme, errors are corrected through data retransmission. Examples of the ARQ scheme include a stop and wait (SAW) scheme, a go-back-N (GBN) scheme, a selective repeat (SR) scheme, etc. The SAW scheme transmits a frame after determining whether the transmitted frame is correctly received. The GBN scheme transmits N consecutive frames, and if transmission is unsuccessful, retransmits all frames transmitted after an erroneous frame. The SR scheme selectively retransmits only the erroneous frame.

The FEC scheme has an advantage in that a time delay is small and no information is additionally exchanged between a transmitting end and a receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment. To solve such disadvantages, a hybrid automatic repeat request (HARQ) scheme is proposed by combining the FEC scheme and the ARQ scheme. In the HARQ scheme, it is determined whether an unrecoverable error is included in data received by a physical layer, and retransmission is requested upon detecting the error, thereby improving performance.

A receiver using the HARQ scheme basically attempts error correction on received data, and determines whether the data will be retransmitted or not by using an error detection code. The error detection code may be a cyclic redundancy check (CRC). When an error of the received data is detected in a CRC detection process, the receiver transmits a non-acknowledgement (NACK) signal to a transmitter. Upon receiving the NACK signal, the transmitter transmits relevant retransmission data according to an HARQ mode. The receiver receives the retransmission data and then performs decoding by combining the retransmission data with previous data. As a result, reception performance is improved.

The HARQ mode can be classified into a chase combining mode and an incremental redundancy (IR) mode. In the chase combining mode, to obtain a signal-to-noise ratio (SNR), error-detected data is combined with retransmitted data instead of discarding the error-detected data. In the IR mode, additional redundant information is incrementally transmitted with retransmitted data to reduce an overhead resulted from retransmission and to obtain a coding gain.

According to a transmission attribute, the HARQ can be classified into an adaptive HARQ and a non-adaptive HARQ. The transmission attribute includes resource allocation, a modulation scheme, a transport block size, etc. In the adaptive HARQ, depending on changes in a channel condition, transmission attributes are entirely or partially changed by comparing transmission attributes used for retransmission with transmission attributes used for initial transmission. In the non-adaptive HARQ, the transmission attributes used for the initial transmission are persistently used irrespective of the changes in the channel condition.

A HARQ-based retransmission scheme can be classified into a synchronous HARQ and an asynchronous HARQ. The synchronous HARQ retransmits data at a time point known to the transmitter and the receiver. In the synchronous HARQ, signaling required to transmit data such as a HARQ processor number can be reduced. The asynchronous HARQ allocates resources for retransmission at an arbitrary time point. In the asynchronous HARQ, an overhead occurs due to signaling required for data transmission.

Data transmission is performed in a transmission time interval (TTI) unit. In general, one subframe constitutes one TTI. However, there is an attempt for configuring one TTI consisting of a plurality of subframes.

Accordingly, there is a need for a method of performing HARQ when a plurality of subframes constitutes one TTI.

SUMMARY OF THE INVENTION

The present invention provides a method of performing hybrid automatic repeat request (HARQ) when a plurality of subframes constitutes one transmission time interval (TTI).

According to an aspect of the present invention, a method of performing HARQ of a receiver in a wireless communication system is provided. The method includes: receiving data in a TTI unit consisting of a plurality of consecutive subframes; and transmitting acknowledgment (ACK)/non-acknowledgment (NACK) for the received data, wherein the data is received using a plurality of redundancy versions respectively allocated to the plurality of subframes, and the ACK/NACK is transmitted with an interval of a predetermined processing delay from a transmission time of a specific redundancy version among the plurality of redundancy versions.

In the aforementioned aspect of the present invention, the ACK/NACK may be based on an error detection result on the specific redundancy version.

In addition, the specific redundancy version may be a frontmost redundancy version in a time domain among the plurality of redundancy versions.

In addition, the specific redundancy version may be attached with a cyclic redundancy check (CRC) to identify the ACK/NACK.

According to another aspect of the present invention, a method of performing HARQ of a transmitter in a wireless communication system is provided. The method includes: transmitting data in a TTI unit consisting of a plurality of consecutive subframes; determining whether the data is successfully received by a receiver; and retransmitting the data according to the determination result, wherein the data is transmitted using a plurality of redundancy versions respectively allocated to the plurality of subframes.

In the aforementioned aspect of the present invention, whether the data is successfully received by the receiver may be determined according to whether the ACK/NACK is received for a specific redundancy version among the plurality of redundancy versions.

In addition, the specific redundancy version may be attached with a CRC to identify the ACK/NACK.

In addition, the data may be retransmitted with an interval of a predetermined processing delay from a transmission time of the NACK for the specific redundancy version.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in downlink and uses the SC-FDMA in uplink. IEEE 802.16m is an evolution of IEEE 802.16e.

Although the following description will focus on the IEEE 802.16m for clarity of explanation, the technical features of the present invention are not limited thereto.

Figure 1:
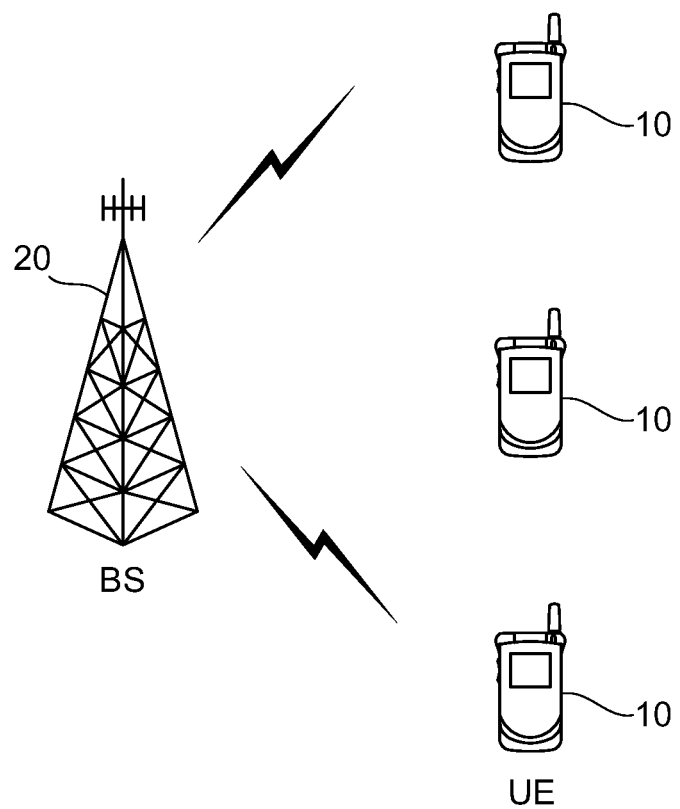
FIG. 1 shows a wireless communication system.

FIG. 1 shows a wireless communication system.

Referring to FIG. 1, the wireless communication system includes at least one base station (BS) 20. The BSs 20 provide communication services to specific geographical regions (generally referred to as cells). Each cell can be divided into a plurality of regions (referred to as sectors). A user equipment (UE) 10 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 20 is generally a fixed station that communicates with the UE 10 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
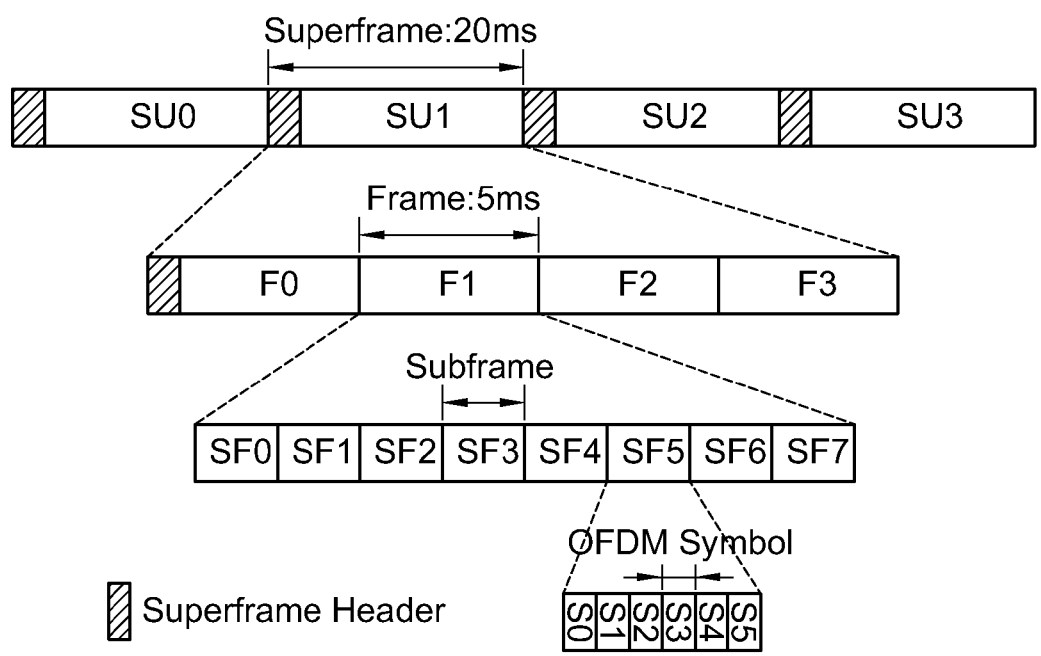
FIG. 2 shows an example of a frame structure.

FIG. 2 shows an example of a frame structure.

Referring to FIG. 2, a superframe includes a superframe header and four radio frames F0, F1, F2, and F3. Although it is shown that each superframe has a size of 20 milliseconds (ms) and each frame has a size of 5 ms, the present invention is not limited thereto. The superframe header may be located at a front-most position of the superframe. A common control channel is assigned to the superframe header. The common control channel is used to transmit information regarding frames constituting the superframe or control information (e.g., system information) that can be commonly utilized by all UEs within a cell.

One frame includes 8 subframes SF0, SF1, SF2, SF3, SF4, SF5, SF6, and SF7. Each subframe can be used for UL or DL transmission. Each subframe may consist of 6 or 7 OFDM symbols, but this is for exemplary purposes only. Time division duplexing (TDD) or frequency division duplexing (FDD) may be applied to the frame. In the TDD, each subframe is used in UL or DL transmission at the same frequency and at a different time. That is, subframes included in a TDD frame are divided into a UL subframe and a DL subframe in a time domain. In the FDD, each subframe is used in UL or DL transmission at the same time and at a different frequency. That is, subframes included in an FDD frame are divided into a UL subframe and a DL subframe in a frequency domain. UL transmission and DL transmission occupy different frequency bands and can be simultaneously performed.

A subframe includes at least one frequency partition. The frequency partition consists of at least one physical resource unit (PRU). The frequency partition may include a localized PRU and/or a distributed PRU. The frequency partition may be used for other purposes such as fractional frequency reuse (FFR) or multicast or broadcast service (MBS).

The PRU is defined as a basic physical unit for allocating resources including a plurality of consecutive OFDM symbols and a plurality of consecutive subcarriers. The number of OFDM symbols included in the PRU may be equal to the number of OFDM symbols included in one subframe. For example, when one subframe consists of 6 OFDM symbols, the PRU may be defined with 18 subcarriers and 6 OFDM symbols. A logical resource unit (LRU) is a basic logical unit for distributed resource allocation and localized resource allocation. The LRU is defined with a plurality of OFDM symbols and a plurality of subcarriers, and includes pilots used in the PRU. Therefore, one LRU includes a specific number of subcarriers, where the specific number depends on the number of allocated pilots.

A logical distributed resource unit (DRU) may be used to obtain a frequency diversity gain. The DRU includes a distributed subcarrier group in one frequency partition. The DRU has the same size as the PRU. One subcarrier is a basic unit of constituting the DRU.

A logical contiguous resource unit (CRU) may be used to obtain a frequency selective scheduling gain. The CRU includes a localized subcarrier group. The CRU has the same size as the PRU.

Figure 3:
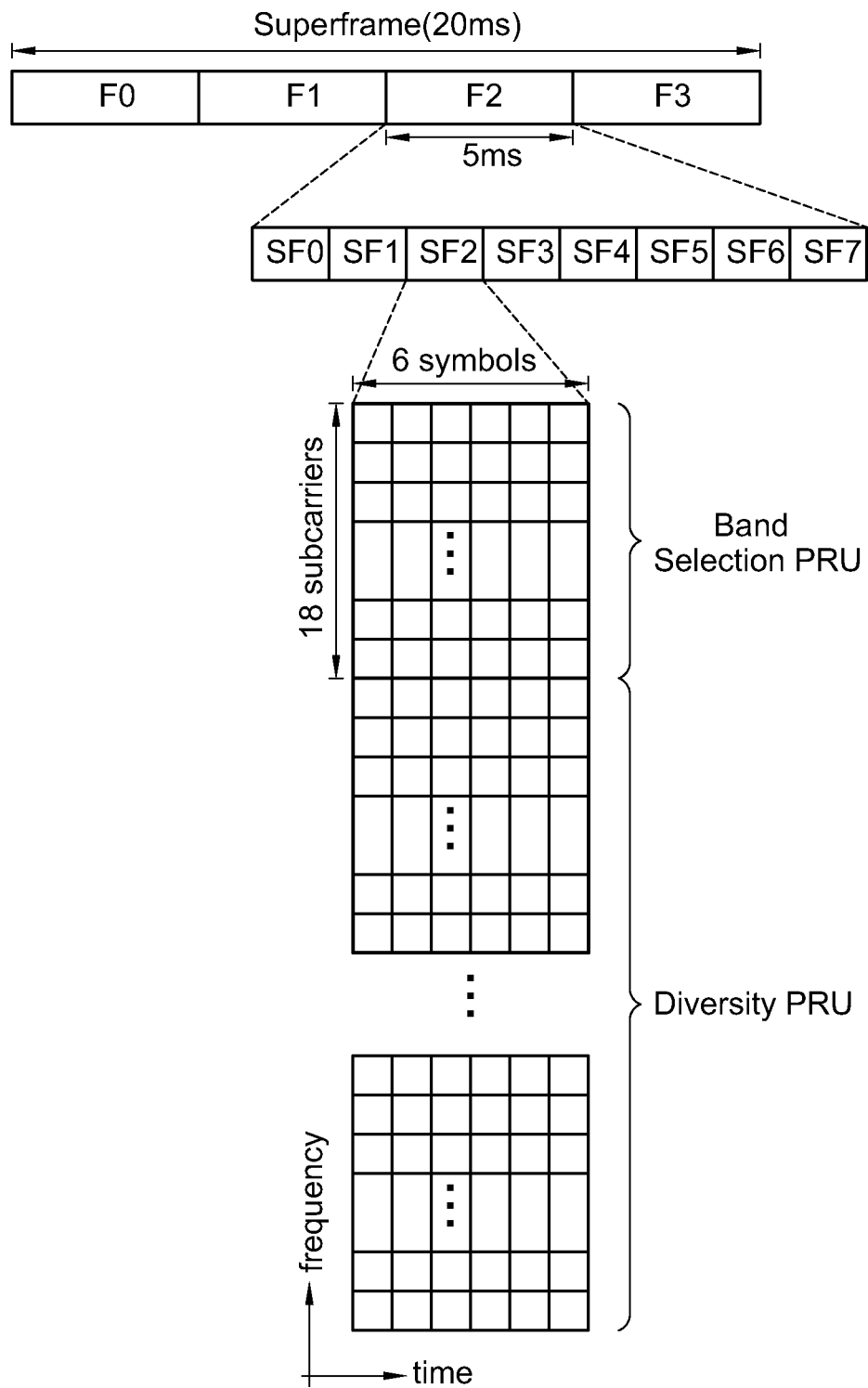
FIG. 3 shows an example of a subchannel structure.

FIG. 3 shows an example of a subchannel structure.

Referring to FIG. 3, a basic unit of a subchannel is a physical resource unit (PRU). For example, one PRU consists of 18 subcarriers×6 OFDM symbols. The subchannel may include at lease one or more PRUs. The subchannel may have a structure in which a band selection PRU and a diversity PRU occupy different frequency bands in one subframe.

Figure 4:
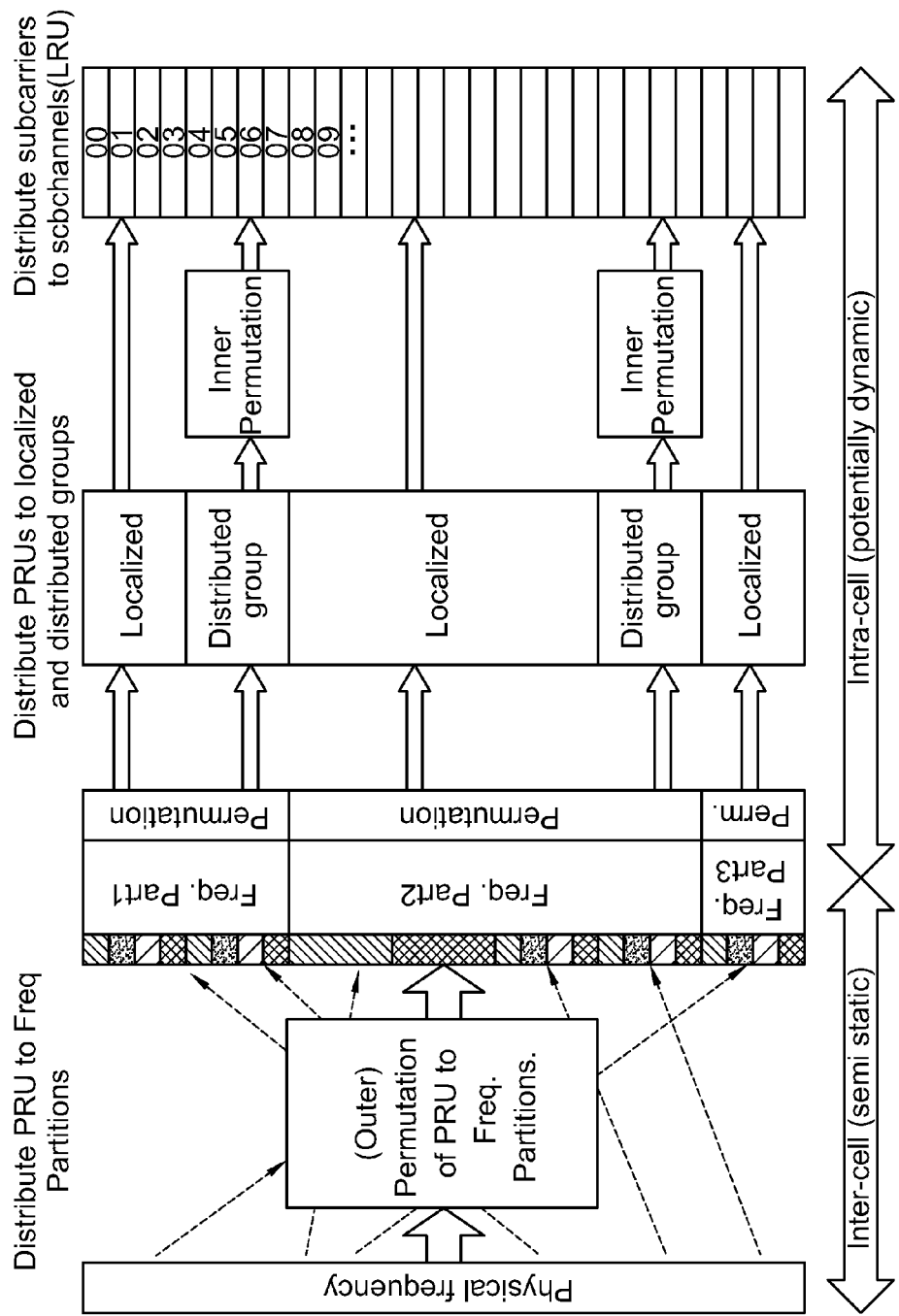
FIG. 4 shows an example of resource unit mapping.

FIG. 4 shows an example of resource unit mapping. A plurality of subcarriers on one OFDM symbol are divided into at least one PRU. Each PRU includes a pilot subcarrier and a data subcarrier.

Referring to FIG. 4, an outer permutation is applied to the PRU. The outer permutation is applied in a unit of at least one or more PRUs. Direct mapping of the outer permutation is supported by only the CRU.

In addition, a rearranged PRU is distributed over frequency partitions. The frequency partition is divided into a DRU and a CRU for each resource group. A sector-specific permutation may be supported. Direct mapping of resources may be supported for localized resources. A size of distributed/localized resource may be flexibly determined for each sector. Next, localized and distributed groups are mapped to the LRU.

An inner permutation is defined for distributed resource allocation in one frequency partition, and is used to spread subcarriers of the DRU throughout the entire distributed resource allocation. A granularity of the inner permutation is equal to a basic unit of constituting the DRU. If it is assumed that N LRUs exist in one distributed group, P permutation sequences are provided. Sub-channelization for a distributed resource allows subcarriers of the LRU to be spread with a full available bandwidth of the distributed resource. There is no inner permutation for localized resource allocation. The PRU is directly mapped to the CRU in each frequency partition.

Figure 5:
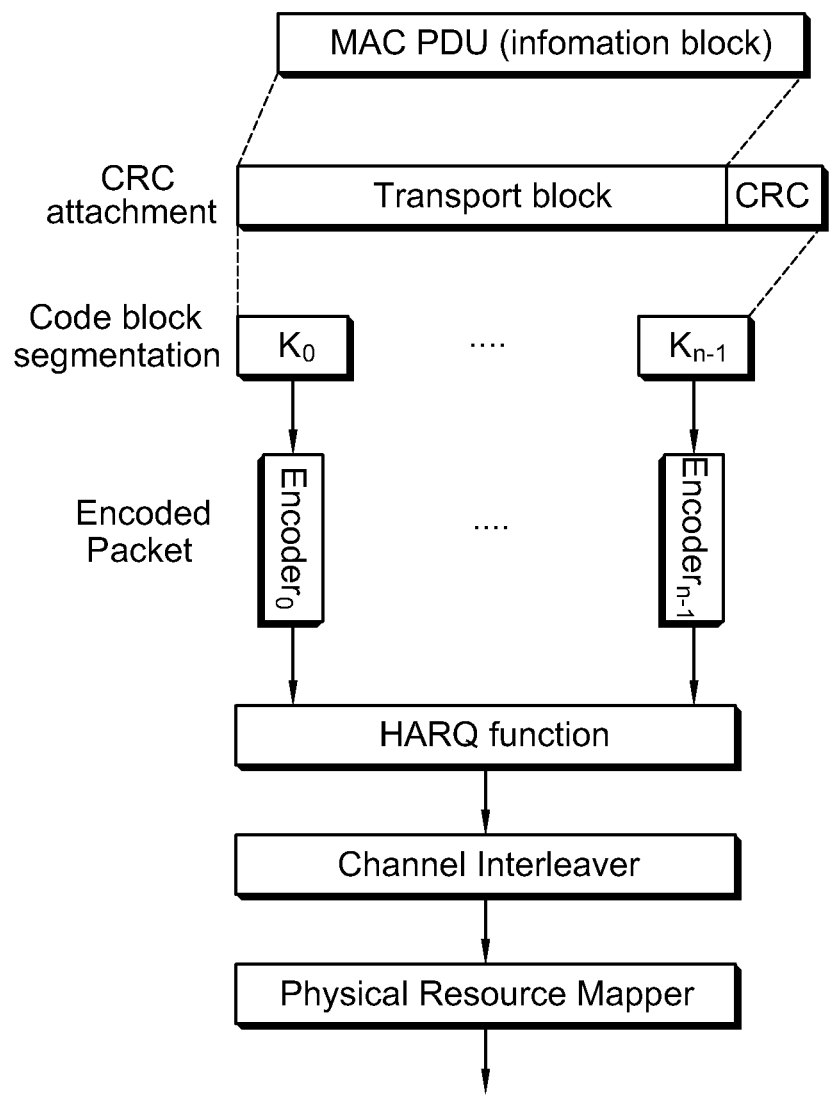
FIG. 5 shows an example of processing an information block for performing hybrid automatic repeat request (HARQ).

FIG. 5 shows an example of processing an information block for performing HARQ.

Referring to FIG. 5, a portion or entirety of the information block is transmitted as a transport block to be transmitted to a physical layer, and an error detection code (i.e., cyclic redundancy check (CRC)) is attached to one transport block. This is called CRC attachment. The information block may be a medium access control (MAC) protocol data unit (PDU). When the physical layer performs HARQ, the MAC PDU is a data unit transmitted from a higher layer (i.e., a MAC layer) to the physical layer.

For channel encoding, the CRC-attached transport block is segmented into suitable sized sub-blocks. This is called code block segmentation. The segmented block is referred to as a code block. An encoder performs encoding on the code block to output an encoded packet. The encoder can use a turbo code which is one of error correction codes. The turbo code is systematic code including information bits as systematic bits. When the turbo code has a code rate of ⅓, two parity bits are allocated to one systematic bit. The error correction code is not limited to the turbo code, and thus the technical features of the present invention can equally apply to a low density parity check code (LDPC), a convolution code, etc.

One HARQ function is performed in a transport block unit. To retransmit erroneous packets, an HARQ processor performs an HARQ mode (i.e., chase combining or IR) and an HARQ scheme (i.e., adaptive HARQ or non-adaptive HARQ) on encoded packets according to a retransmission environment.

A channel interleaver interleaves the encode packets in a bit unit to spread transmission errors depending on a channel. A physical resource mapper converts the interleaved encoded packets into data symbols and maps the data symbols to a data region.

Figure 6:
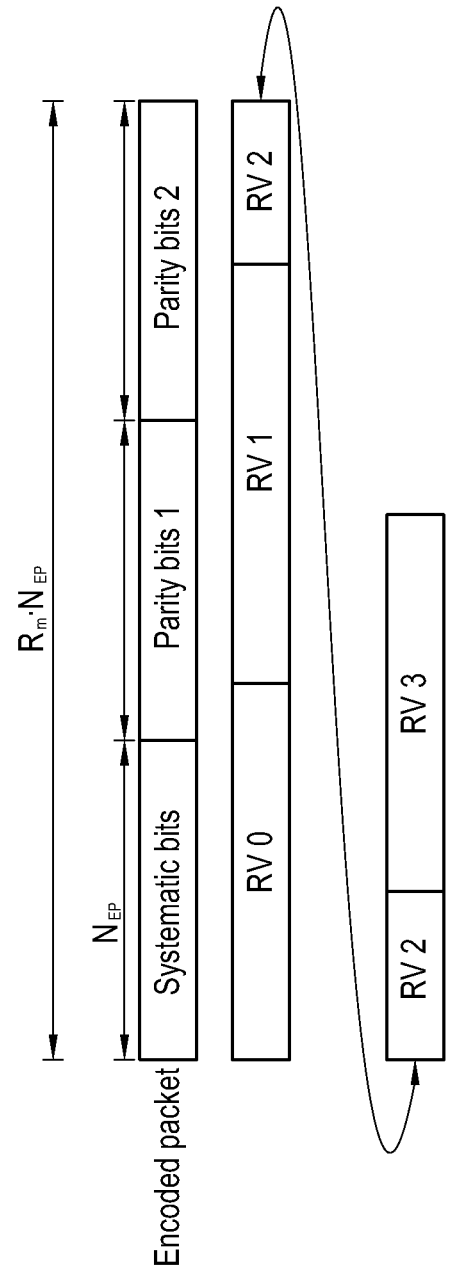
FIG. 6 shows an example of a redundancy version of an encoded packet.

FIG. 6 shows an example of a redundancy version of an encoded packet.

Referring to FIG. 6, all bit-streams of the encoded packet are referred to as a mother codeword. The mother codeword generated using a turbo code includes systematic bits whose bit-stream has the same length as a code block and at least one parity bit related to the systematic bits. If a mother code rate is $1/R_m$ and a size of a code block input to an encoder is $N_{EP}$, a length of the mother codeword is $Rm \cdot N_{EP}$. In a case where the encoder uses a convolution turbo code (CTC) having a double binary (or duo-binary) structure, $N_{EP}$ denotes the number of bits input to a CTC turbo encoder and is a parameter defined as a size of the encoded packet. If N denotes a size of an internal interleaver of the CTC turbo encoder, $N_{EP} = 2 \times N$. When the mother code rate is ⅓, the mother codeword includes one systematic bit and two parity bits.

When HARQ is performed in an incremental redundancy (IR) mode, the mother codeword is divided into a plurality of bit-stream blocks and is then transmitted in a bit-stream block unit. A size of the bit-stream block can be determined according to a modulation scheme to be used, resource allocation, etc. The modulation scheme may be various, such as binary-phase shift keying (BPSK), quadrature-phase shift keying (QPSK), 16 quadrature amplitude modulation (QAM), 64 QAM, etc. The bit-stream block is indicated by a redundancy version (RV). For example, a first bit-stream block including a symmetric bit is indicated by an RV 0, a second bit-stream block consecutive to the first bit-stream block is indicated by an RV 1, a third bit-stream block consecutive to the second bit-stream block is indicated by an RV 2, and a fourth bit-stream block consecutive to the third bit-stream block is indicated by an RV 3. In this case, if the consecutive bit-stream blocks exceed the length of the mother codeword, the excessive parts are cyclically transmitted.

Although it is described that bit-stream blocks of different RVs have the same size, a size of a bit-stream block of each RV can be determined to have a different size. For example, in non-adaptive HARQ, a bit-stream block of each RV may be determined to have the same size, and in adaptive HARQ, bit-stream blocks of different RVs may be determined to have different sizes. One bit-stream block may be transmitted by being mapped to one subframe. The bit-stream blocks of different RVs may be transmitted by being mapped to different subframes.

Hereinafter, data transmission using HARQ will be described.

Figure 7:
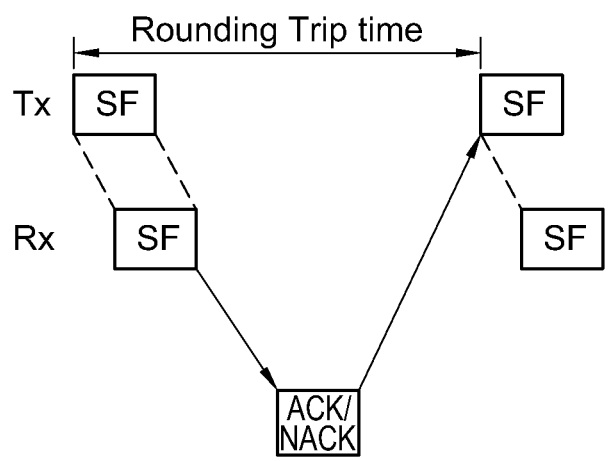
FIG. 7 shows data transmission using HARQ.

FIG. 7 shows data transmission using HARQ.

Referring to FIG. 7, a transmitter Tx transmits data by using a subframe, receives an ACK/NACK signal for the subframe from a receiver Rx, and thereafter retransmits the data. A round trip time (RTT) is defined as a time from when data is transmitted by the transmitter to a time immediately before data is retransmitted. The RTT includes a processing delay defined as a time required for data processing in the transmitter Tx and the receiver Rx.

Data transmission is performed in a transmission time interval (TTI) unit. The TTI is a time for transmitting an encoded packet through a radio interface. The encoded packet is generated in a physical layer. In IEEE 802.16e, one TTI consists of one subframe, and data packets are transmitted in one subframe unit by using HARQ. In IEEE 802.16m, one TTI consists of multiple subframes, and thus two or more subframes can constitute one TTI. Therefore, there is a need for a method of transmitting a data packet by using HARQ when two or more subframes constitute one TTI. The TTI consisting of the two or more subframes may also be referred to as multiple TTIs.

Figure 8:
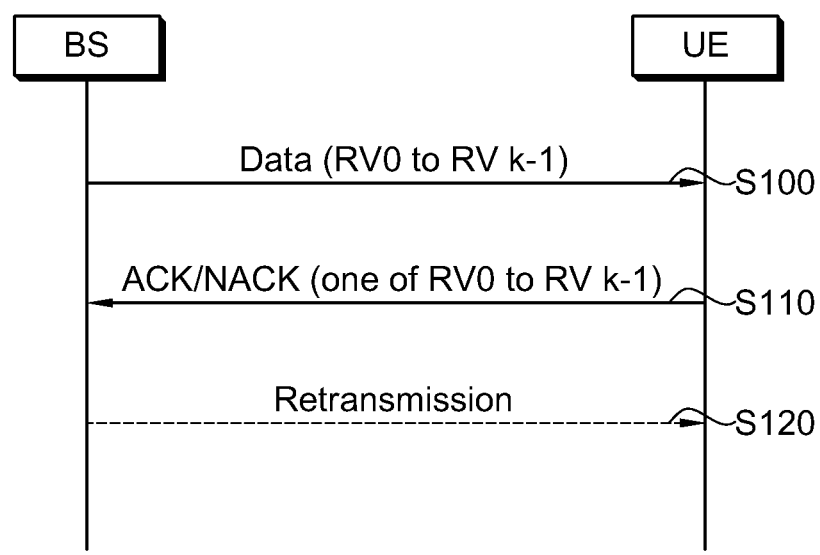
FIG. 8 is a flow diagram showing a data transmission method using HARQ according to an embodiment of the present invention.

FIG. 8 is a flow diagram showing a data transmission method using HARQ according to an embodiment of the present invention. DL data transmission is assumed hereinafter for exemplary purposes only. However, technical features of the present invention can also apply to UL data transmission.

Referring to FIG. 8, a BS transmits data to a UE in a TTI unit consisting of a plurality of subframes (step S100). The plurality of subframes may be consecutive to one another. The BS can transmit a plurality of redundancy versions (i.e., RV 0 to RV k−1) respectively allocated to a plurality of consecutive subframes (i.e., SF 0 to SF k−1). Hereinafter, a redundancy version (RV) may be not only a redundancy in an HARQ incremental redundancy (IR) but also repetition on the same data packet in HARQ chase combining. In addition, the RV may be a modified form of the same data packet obtained through constellation rearrangement. The RV can also be referred to as an HARQ sub-packet identifier (SPI) for IR. A UE located in a cell edge can be easily affected by interference from a neighboring cell. When a plurality of RVs are transmitted to this UE, a coding gain or an SNR combining gain can be obtained.

The UE transmits ACK/NACK for the received data to the BS (step S110). The UE can transmit the ACK/NACK with an interval of a predetermined processing delay from a transmission time of a specific RV among the plurality of RVs. The predetermined processing delay may be two or three subframes. The ACK/NACK may be an error detection result of the specific RV combined with an RV transmitted before the specific RV, or may be an error detection result of the specific RV. The specific RV may be attached with an additional cyclic redundancy check (CRC) to identify the ACK/NACK. Accordingly, an amount of data that can be carried on an RV other than the specific RV may increase. The specific RV may be a front-most RV in a time domain among the plurality of RVs. If the specific RV is the front-most RV in the time domain, an overhead of the UE is reduced, and an HARQ delay decreases. The NACK is transmitted when an error is detected or an information block cannot be decoded. The ACK is transmitted when the error is not detected and the information block can be decoded. The ACK implies that data is successfully transmitted. The NACK implies that data retransmission is requested.

The BS retransmits data to the UE according to the result of step S110 (step S120). If the BS receives the ACK from the UE, the BS does not have to retransmit the data to the UE. If the BS receives the NACK from the UE or receives no data for a specific time period, the BS retransmits the data to the UE. The BS may retransmit the data to the UE with an interval of a predetermined processing delay from a transmission time of the NACK from the UE.

When an error is detected from some RVs among the plurality of RVs and thus ACK/NACK is transmitted, an overhead of the UE can be reduced. In particular, in a case of detecting an error from the front-most RV in the time domain among the plurality of RVs, once the error is detected, there is no need to detect an error from the remaining RVs. In addition, in the case of using a TDD system, data transmission and ACK/NACK transmission can be performed within one frame, thereby decreasing an HARQ delay.

ACK/NACK transmission and data retransmission timing will be described hereinafter when data is transmitted using HARQ according to an embodiment of the present invention. In the present invention, it is assumed that a TDD system is used, a frame n is consecutive to a frame n+1 in a time domain, and a ratio of DL subframes to UL subframes included in one frame (i.e., a DL/UL ratio) is 5:3. However, technical features of the present invention are not limited thereto, and thus can also apply to various cases, for example, when the DL/UL ratio=4:4, 6:2, etc. In addition, although DL data transmission is described herein as an example, the technical features of the present invention are not limited thereto and thus can also apply to UL data transmission. In DL data transmission, a transmitter is a BS and a receiver is a UE. In the UL data transmission, the transmitter is the UE, and the receiver is the BS.

Figure 9:
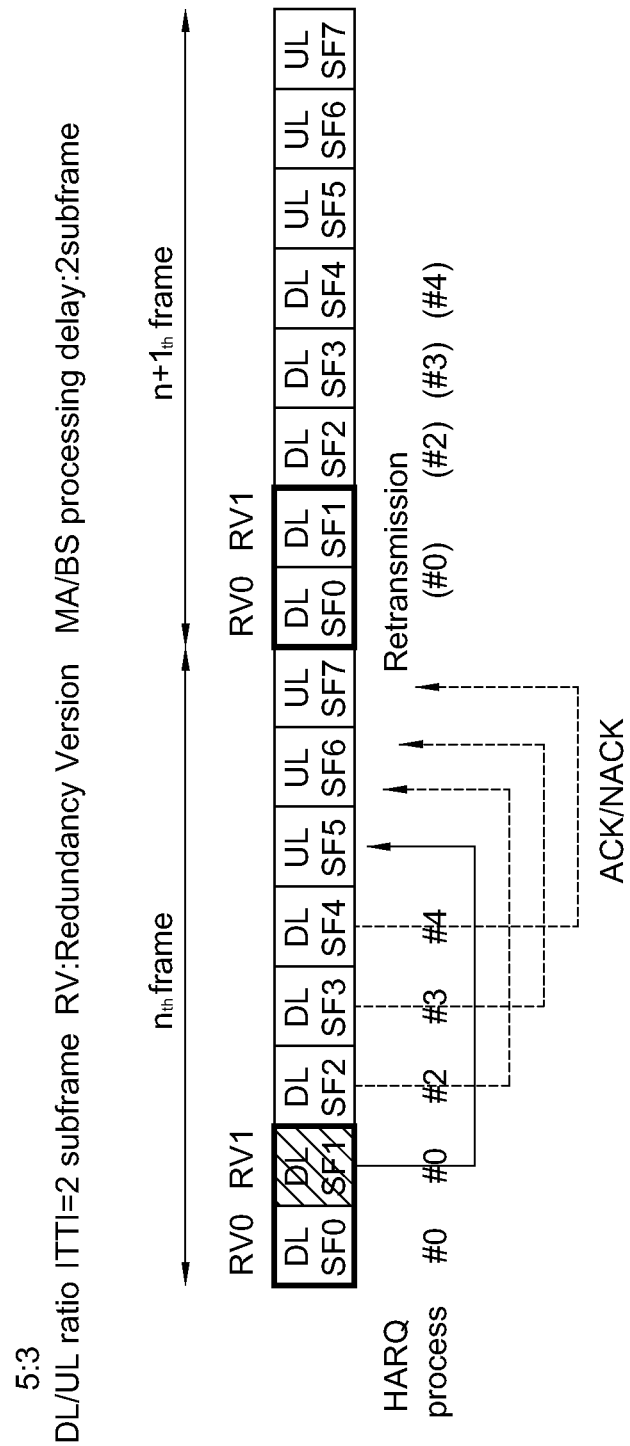
FIG. 9 and FIG. 10 show HARQ timing according to an embodiment of the present invention.
Figure 10:
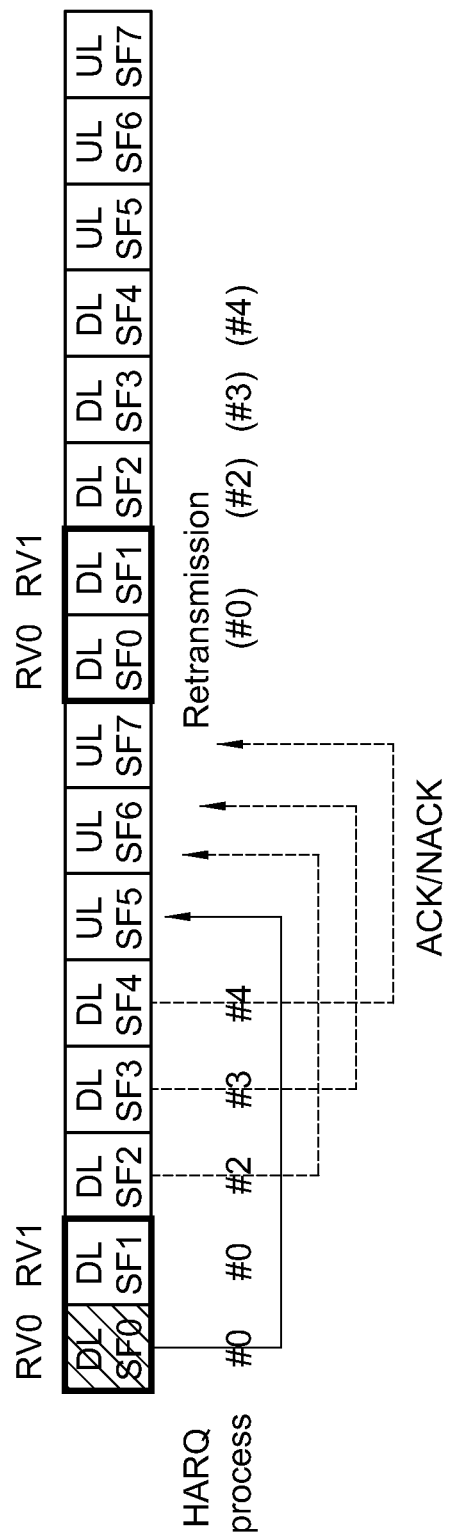

FIG. 9 and FIG. 10 show HARQ timing according to an embodiment of the present invention.

An HARQ process #0 configures two consecutive subframes as one TTI. Each of HARQ processes #2, #3, and #4 configure one subframe as one TTI. To perform the HARQ process #0, a transmitter transmits an RV 0 on an subframe (SF) 0 of a frame n, and transmits an RV 1 on an SF 1. Hereinafter, a redundancy version (RV) may be not only a redundancy in an HARQ incremental redundancy (IR) but also repetition on the same data packet in HARQ chase combining. In addition, the RV may be a modified form of the same data packet obtained through constellation rearrangement. The transmitter may transmit a data packet for the HARQ process #2 on an SF 2 of the frame n, transmit a data packet for the HARQ process #3 on an SF 3 of the frame n, and transmit a data packet for the HARQ process #4 on an SF 4 of the frame n.

A receiver feeds back ACK/NACK for data packet transmission in the HARQ process #0, the HARQ process #2, the HARQ process #3, and the HARQ process #4 to the transmitter.

Referring to FIG. 9, the receiver performs CRC detection on the RV 1, and a processing delay is 2 subframes. Therefore, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since an SF 5, an SF 6, and an SF 7 are UL subframes, the receiver can transmit the ACK/NACK to the transmitter on the SF 5. In this case, the ACK/NACK transmitted by the receiver is a feedback for a transmission result of the RV 1 or a feedback for a transmission result of the RV 1 combined with the RV 0. The receiver can feed back the ACK/NACK for data packet transmission of the HARQ processes #2, #3, and #4 to the transmitter respectively on the SF 6, the SF 6, and the SF 7. However, a format of a subframe on which the receiver transmits the ACK/NACK is not limited thereto.

According to a result of receiving the ACK/NACK from the receiver, the transmitter can perform retransmission for the HARQ process #0 on an SF 0 and an SF 1 of a frame n+1. The transmitter can perform retransmission for the HARQ processes #2, #3, and #4 on an SF 2, an SF 3, and an SF 4 of the frame n+1.

Referring to FIG. 10, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since the SF 5, the SF 6, and the SF 7 are UL subframes, the receiver can transmit the ACK/NACK to the transmitter on the SF 5. In this case, the ACK/NACK transmitted by the receiver is a feedback for a transmission result of the RV 0. The receiver can feed back the ACK/NACK for data packet transmission of the HARQ processes #2, #3, and #4 to the transmitter respectively on the SF 6, the SF 6, and the SF 7. However, a format of a subframe on which the receiver transmits the ACK/NACK is not limited thereto.

According to a result of receiving the ACK/NACK from the receiver, the transmitter can perform retransmission for the HARQ process #0 on the SF 0 and the SF 1 of the frame n+1. The transmitter can perform retransmission for the HARQ processes #2, #3, and #4 on the SF 2, the SF 3, and the SF 4 of the frame n+1.

Figure 11:
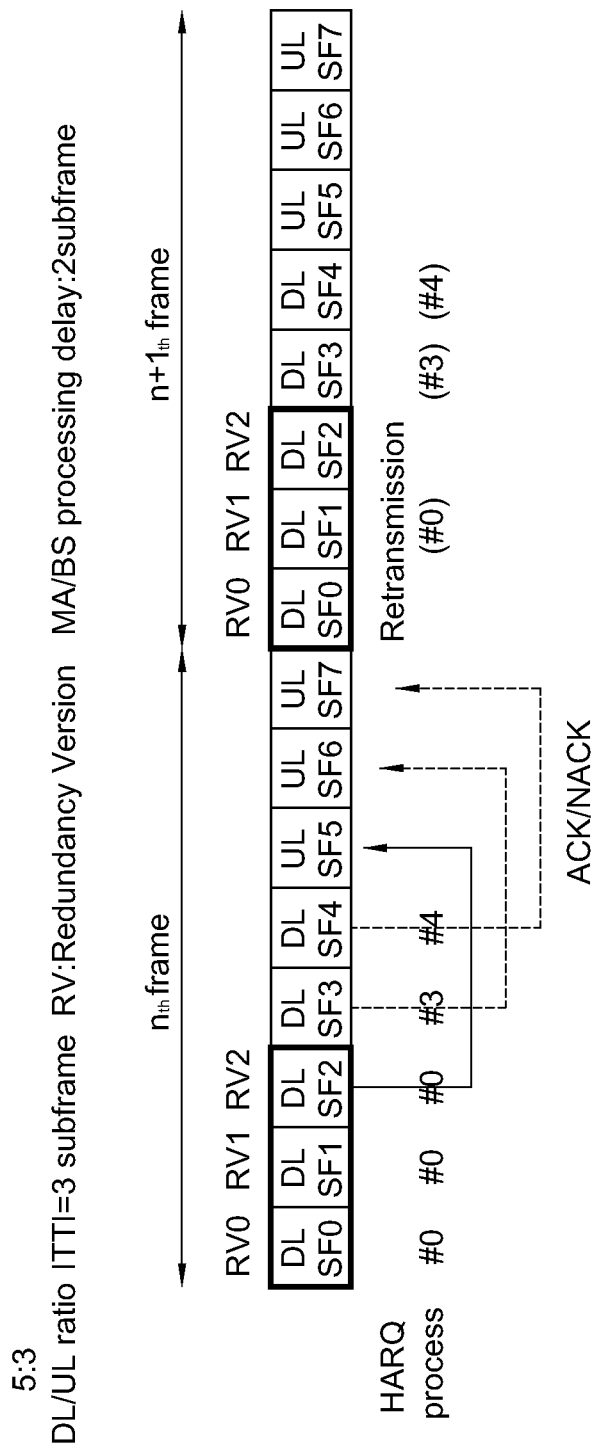
FIG. 11 to FIG. 13 shows HARQ timing according to an embodiment of the present invention.
Figure 12:
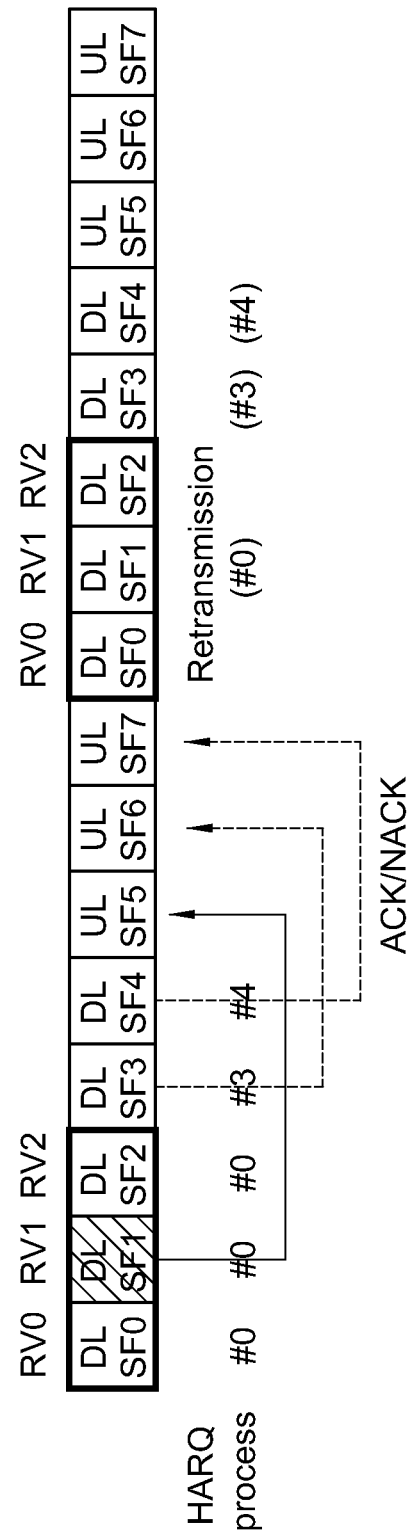
Figure 13:
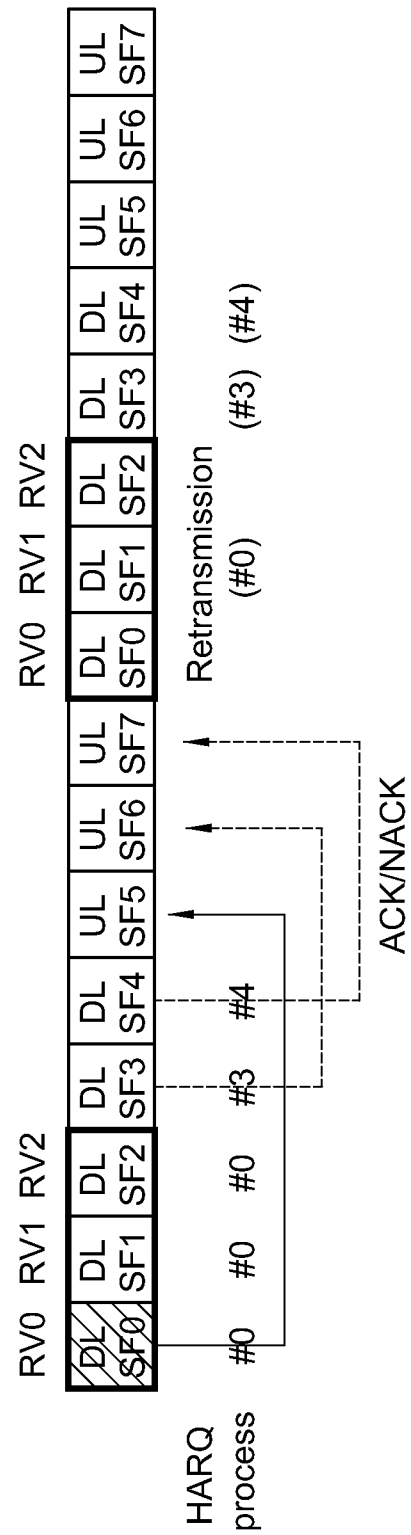

FIG. 11 to FIG. 13 show HARQ timing according to an embodiment of the present invention.

An HARQ process #0 configures three consecutive subframes as one TTI. Each of HARQ processes #3 and #4 constitutes one subframe as one TTI. To perform the HARQ process #0, a transmitter transmits an RV 0 on an SF 0 of a frame n, transmits an RV 1 on an SF 1, and transmits an RV 2 on an SF 2. The transmitter may transmit a data packet for the HARQ process #3 on an SF 3 of the frame n, and transmit a data packet for the HARQ process #4 on an SF 4 of the frame n.

A receiver feeds back ACK/NACK for data packet transmission of the HARQ process #0, the HARQ process #3, and the HARQ process #4 to the transmitter.

Referring to FIG. 11, the receiver performs CRC detection on the RV 2. Since a processing delay is 2 subframes, the receiver can feed back ACK/NACK with an interval of at least 2 subframes from a transmission time of the RV 2. That is, since the transmission time of the RV 2 is the SF 2, the receiver can feed back the ACK/NACK after an SF 5. In this case, the ACK/NACK transmitted by the receiver may be a feedback for a transmission result of the RV 2 or a feedback for a transmission result of the RV 2 combined with the RV 0. The receiver can feed back the ACK/NACK for data packet transmission of the HARQ processes #3 and #4 to the transmitter respectively on an SF 6 and an SF 7. However, a format of a subframe on which the receiver transmits the ACK/NACK is not limited thereto.

According to a result of receiving the ACK/NACK from the receiver, the transmitter can perform retransmission for the HARQ process #0 on an SF 0, an SF 1, and an SF 2 of a frame n+1. The transmitter can perform retransmission for the HARQ processes #3 and #4 on an SF 3 and an SF 4 of the frame n+1.

Referring to FIG. 12, the receiver performs CRC detection on the RV 1. Since a processing delay is 2 subframes, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since the SF 5, the SF 6, and the SF 7 are UL subframes, the receiver can transmit the ACK/NACK to the transmitter on the SF 5. In this case, the ACK/NACK transmitted by the receiver may be a feedback for a transmission result of the RV 1 or a feedback for a transmission result of the RV 1 combined with the RV 0. The receiver can feed back the ACK/NACK for data packet transmission of the HARQ processes #3 and #4 to the transmitter respectively on the SF 6 and the SF 7. However, a format of a subframe on which the receiver transmits the ACK/NACK is not limited thereto.

According to a result of receiving the ACK/NACK from the receiver, the transmitter can perform retransmission for the HARQ process #0 on the SF 0, the SF 1, and the SF 2 of the frame n+1. The transmitter can perform retransmission for the HARQ processes #3 and #4 on the SF 3 and the SF 4 of the frame n+1.

Referring to FIG. 13, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since the SF 5, the SF 6, and the SF 7 are UL subframes, the receiver can transmit the ACK/NACK to the transmitter on the SF 5. In this case, the ACK/NACK transmitted by the receiver is a feedback for a transmission result of the RV 0. The receiver can feed back the ACK/NACK for data packet transmission of the HARQ processes #3 and #4 to the transmitter respectively on the SF 6 and the SF 7. However, a format of a subframe on which the receiver transmits the ACK/NACK is not limited thereto.

According to a result of receiving the ACK/NACK from the receiver, the transmitter can perform retransmission for the HARQ process #0 on the SF 0, the SF 1, and the SF 2 of the frame n+1. The transmitter can perform retransmission for the HARQ processes #3 and #4 on the SF 3 and the SF 4 of the frame n+1.

FIG. 14 to FIG. 17 show HARQ timing according to an embodiment of the present invention.

An HARQ process #0 configures four consecutive subframes as one TTI. An HARQ process #4 configures one subframe as one TTI. To perform the HARQ process #0, a transmitter transmits an RV 0 on an SF 0 of a frame n, transmits an RV 1 on an SF 1, transmits an RV 2 on an SF 2, and transmits an RV 3 on an SF 3. The transmitter may transmit a data packet for the HARQ process #4 on an SF 4 of the frame n.

A receiver feeds back ACK/NACK for data packet transmission of the HARQ process #0 and the HARQ process #4 to the transmitter.

Figure 14:
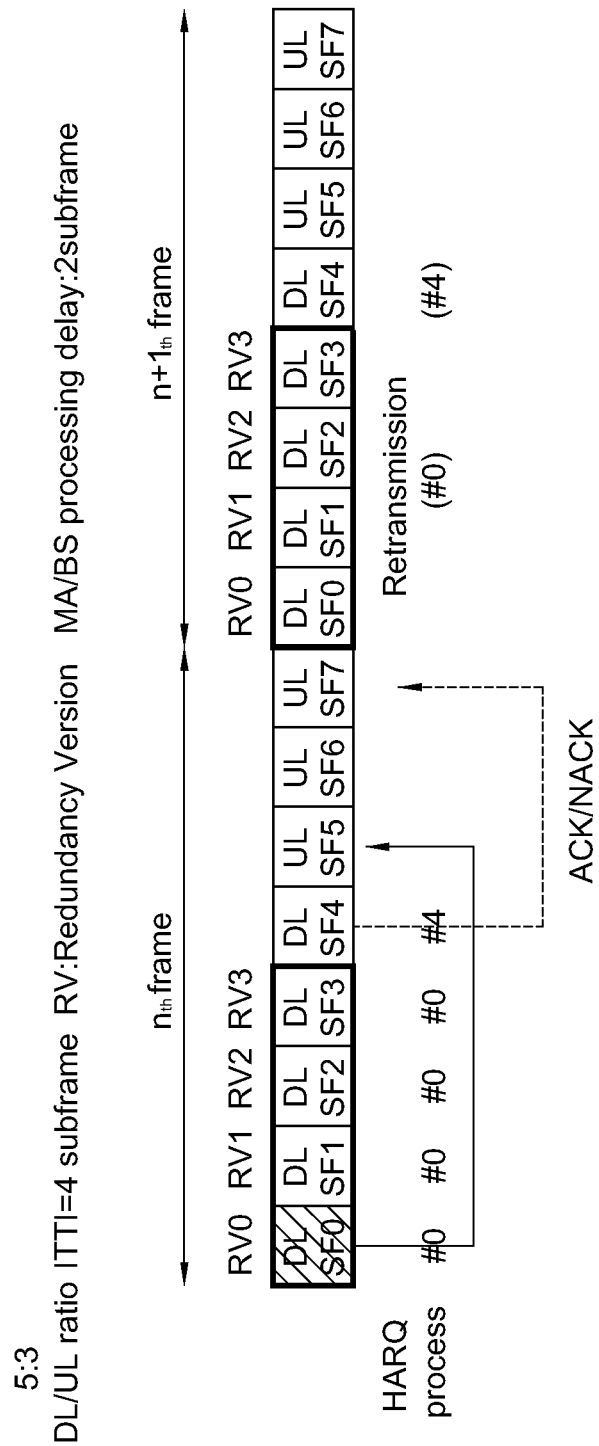
FIG. 14 to FIG. 17 shows HARQ timing according to an embodiment of the present invention.

Referring to FIG. 14, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since an SF 5, an SF 6, and an SF 7 are UL subframes, the receiver can transmit the ACK/NACK to the transmitter on the SF 5. In this case, the ACK/NACK transmitted by the receiver is a feedback for a transmission result of the RV 0. The receiver can feed back the ACK/NACK for data packet transmission of the HARQ process #4 to the transmitter on the SF 7. However, a format of a subframe on which the receiver transmits the ACK/NACK is not limited thereto.

According to a result of receiving the ACK/NACK from the receiver, the transmitter can perform retransmission for the HARQ process #0 on an SF 0, an SF 1, an SF 2, and the SF 3 of a frame n+1. The transmitter can perform retransmission for the HARQ process #4 on an SF 4 of the frame n+1.

Figure 15:
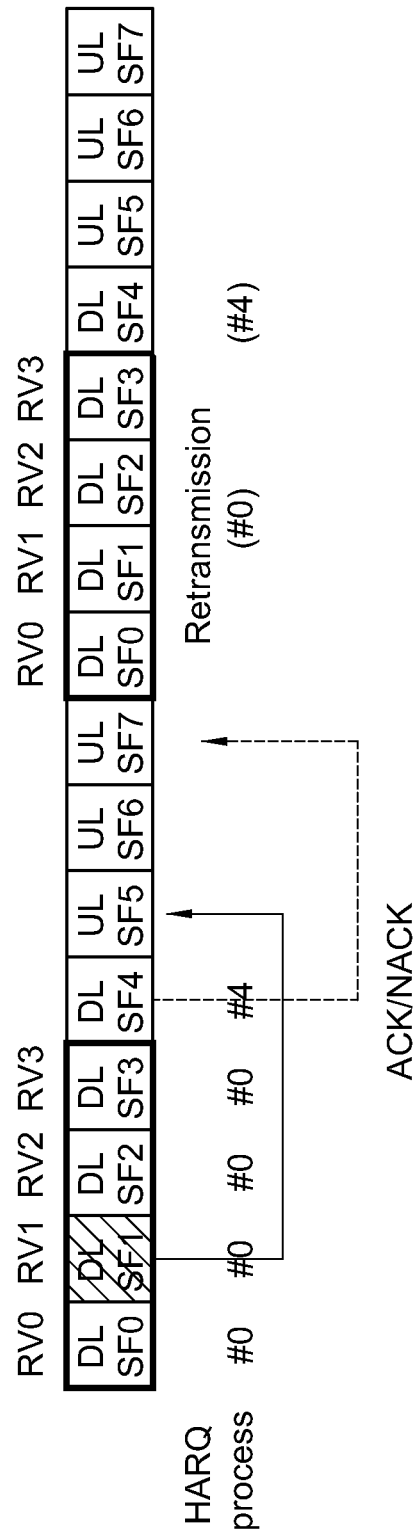

Referring to FIG. 15, the receiver performs CRC detection on the RV 1. Since a processing delay is 2 subframes, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since the SF 5, the SF 6, and the SF 7 are UL subframes, the receiver can transmit the ACK/NACK to the transmitter on the SF 5. In this case, the ACK/NACK transmitted by the receiver is a feedback for a transmission result of the RV 1 or a feedback for a transmission result of the RV 1 combined with the RV 0 and the RV 1. The receiver can feed back the ACK/NACK for data packet transmission of the HARQ process #4 to the transmitter on the SF 7. However, a format of a subframe on which the receiver transmits the ACK/NACK is not limited thereto.

According to a result of receiving the ACK/NACK from the receiver, the transmitter can perform retransmission for the HARQ process #0 on the SF 0, the SF 1, the SF 2, and the SF 3 of the frame n+1. The transmitter can perform retransmission for the HARQ process #4 on the SF 4 of the frame n+1.

Figure 16:
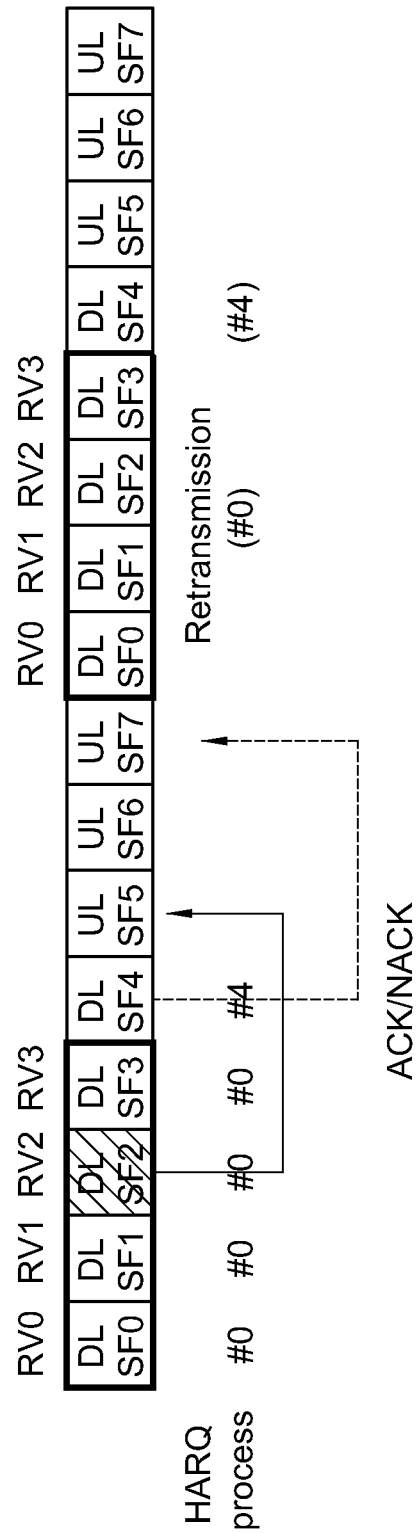

Referring to FIG. 16, the receiver performs CRC detection on the RV 2. Since a processing delay is 2 subframes, the receiver can feed back ACK/NACK with an interval of at least 2 subframes from a transmission time of the RV 2. That is, since the transmission time of the RV 2 is the SF 2, the receiver can feed back the ACK/NACK on the SF 5. In this case, the ACK/NACK transmitted by the receiver may be a feedback for a transmission result of the RV 2 or a feedback for a transmission result of the RV 2 combined with the RV 0. The receiver can feed back the ACK/NACK for data packet transmission of the HARQ process #4 to the transmitter on the SF 7. However, a format of a subframe on which the receiver transmits the ACK/NACK is not limited thereto.

According to a result of receiving the ACK/NACK from the receiver, the transmitter can perform retransmission for the HARQ process #0 on the SF 0, the SF 1, the SF 2, and the SF 3 of the frame n+1. The transmitter can perform retransmission for the HARQ process #4 on the SF 4 of the frame n+1.

Figure 17:
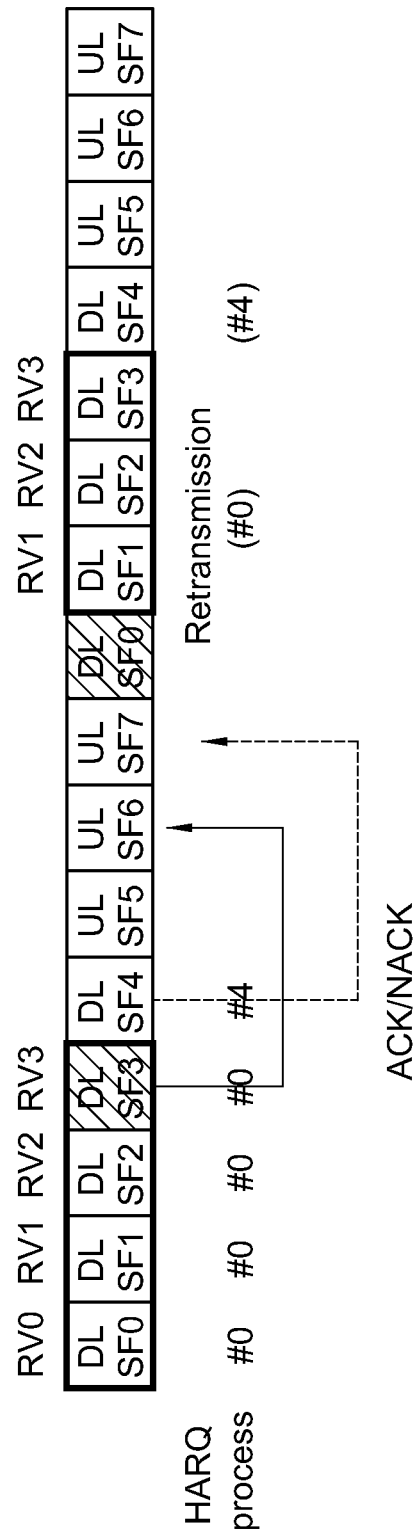

Referring to FIG. 17, the receiver performs CRC detection on the RV 3. Since a processing delay is 2 subframes, the receiver can feed back ACK/NACK with an interval of at least 2 subframes from a transmission time of the RV 3. That is, since the transmission time of the RV 3 is the SF 3, the receiver can feed back the ACK/NACK after the SF 6. In this case, the ACK/NACK transmitted by the receiver may be a feedback for a transmission result of the RV 3 or a feedback for a transmission result of the RV 3 combined with the RV 0. The receiver can feed back the ACK/NACK for data packet transmission of the HARQ process #4 to the transmitter on the SF 7. However, a format of a subframe on which the receiver transmits the ACK/NACK is not limited thereto.

According to a result of receiving the ACK/NACK from the receiver, the transmitter can perform retransmission for the HARQ process through the frame n+1. In this case, the receiver transmits ACK/NACK for a transmission result of the RV 3 on the SF 6, and a processing delay is 2 subframes. Therefore, if the receiver transmits NACK on the SF 6, the transmitter may perform retransmission for the HARQ process #0 after the SF 1 of the frame n+1. That is, if the transmitter receives NACK from the receiver, the transmitter retransmits the RV 1 to the RV 3 on the SF 1 to the SF 3 of the frame n+1. The transmitter cannot retransmit the RV 0 on the SF 0 of the frame n+1.

FIG. 18 to FIG. 25 shows HARQ timing according to an embodiment of the present invention.

An HARQ process #0 configures two consecutive subframes as one TTI. An HARQ process #2 configures three consecutive subframes as one TTI. To perform the HARQ process #0, a transmitter transmits an RV 0 on an SF 0 of a frame n, and transmits an RV 1 on an SF 1. To perform the HARQ process #2, the transmitter transmits an RV 20 on an SF 2 of the frame n, transmits an RV 21 on an SF 3, and transmits an RV 22 on an SF 4.

A receiver feeds back ACK/NACK for data packet transmission of the HARQ process #0 and the HARQ process #2 to the transmitter.

Figure 18:
FIG. 18 to FIG. 25 shows HARQ timing according to an embodiment of the present invention.
Figure 19:
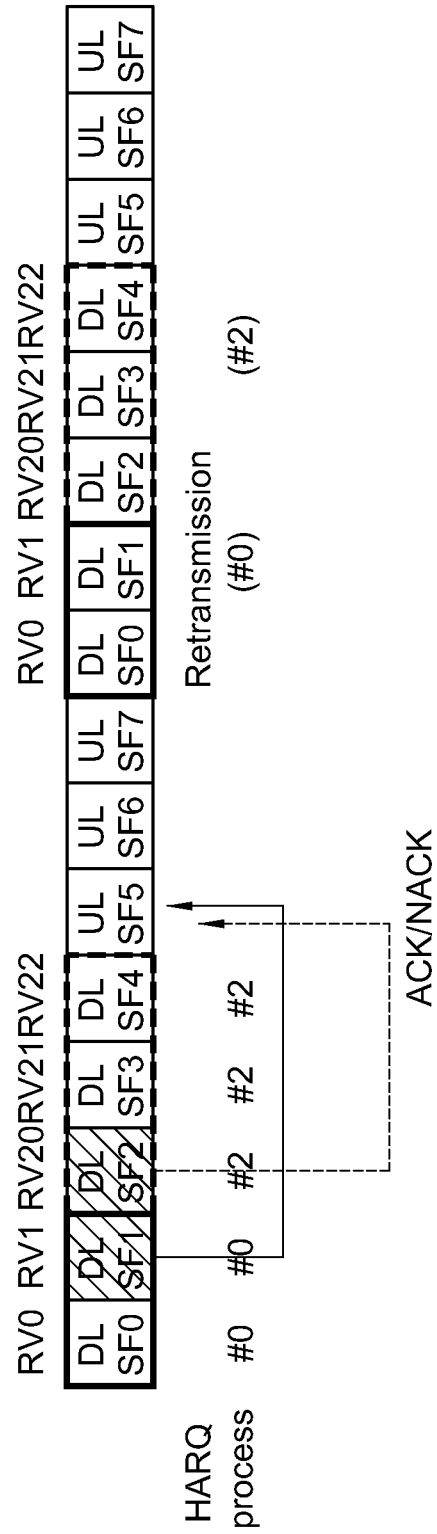

Referring to FIG. 18 and FIG. 19, for the HARQ process #0, the receiver performs CRC detection on the RV 1. Since a processing delay is 2 subframes, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since an SF 5, an SF 6, and an SF 7 are UL subframes, the receiver can transmit the ACK/NACK to the transmitter on the SF 5. In this case, the ACK/NACK transmitted by the receiver may be a feedback for a transmission result of the RV 1 or a feedback for a transmission result of the RV 1 combined with the RV 0. For the HARQ process #2, the receiver performs CRC detection on the RV 20. Since a processing delay is 2 subframes, the receiver can feed back ACK/NACK after the SF 5. That is, the receiver can feed back a transmission result of the RV 20 on the SF 6 as shown in FIG. 18 or on the SF 5 as shown in FIG. 19.

According to a result of receiving the ACK/NACK from the receiver, the transmitter can perform retransmission for the HARQ process #0 on an SF 0 and an SF 1 of a frame n+1. The transmitter can perform retransmission for the HARQ processes #2 on an SF 2, an SF 3, and an SF 4 of the frame n+1.

Figure 20:
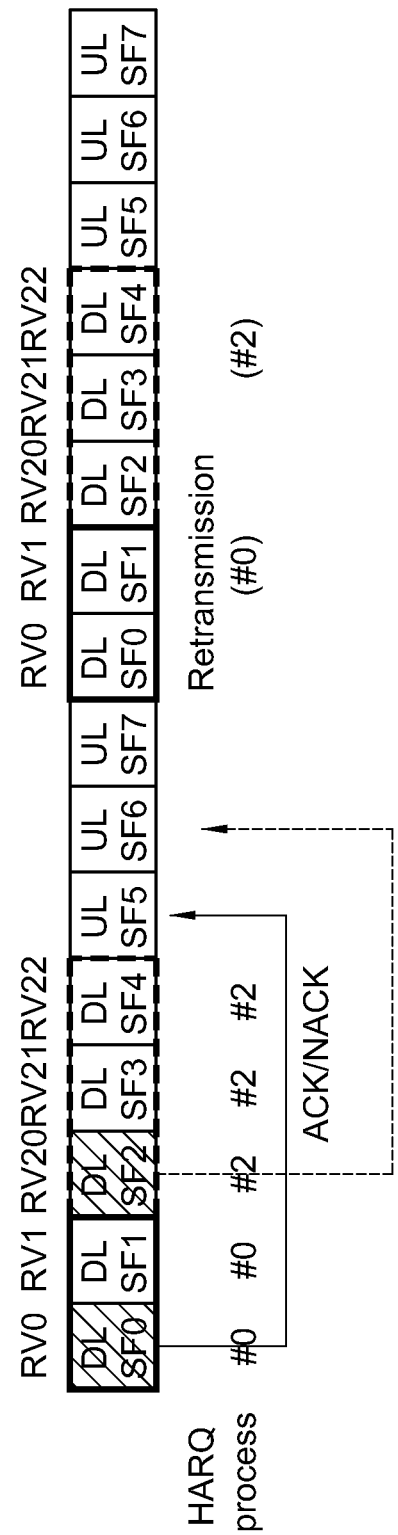
Figure 21:
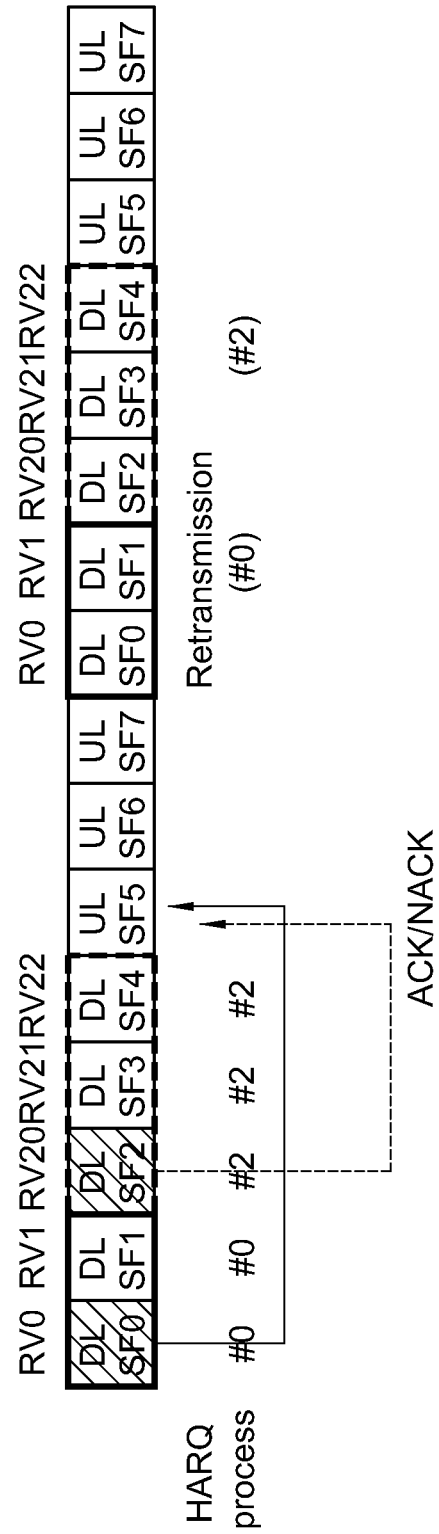

Referring to FIG. 20 and FIG. 21, for the HARQ process #0, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since the SF 5, the SF 6, and the SF 7 are UL subframes, the receiver can transmit the ACK/NACK to the transmitter on the SF 5. For the HARQ process #2, the receiver performs CRC detection on the RV 20. Since a processing delay is 2 subframes, the receiver can feed back ACK/NACK after the SF 5. That is, the receiver can feed back a transmission result of the RV 20 on the SF 6 as shown in FIG. 20 or on the SF 5 as shown in FIG. 21.

According to a result of receiving the ACK/NACK from the receiver, the transmitter can perform retransmission for the HARQ process #0 on the SF 0 and the SF 1 of the frame n+1. The transmitter can perform retransmission for the HARQ processes #2 on the SF 2, the SF 3, and the SF 4 of the frame n+1.

Figure 22:
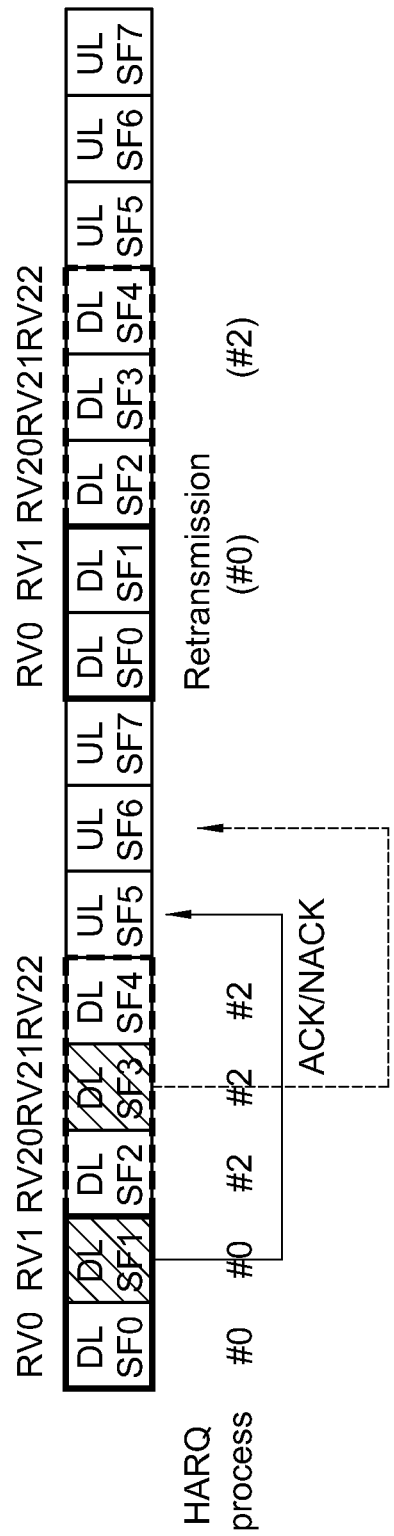

Referring to FIG. 22, for the HARQ process #0, the receiver performs CRC detection on the RV 1. Since a processing delay is 2 subframes, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since the SF 5, the SF 6, and the SF 7 are UL subframes, the receiver can transmit the ACK/NACK to the transmitter on the SF 5. For the HARQ process #2, the receiver performs CRC detection on an RV 21. Since a processing delay is 2 subframes, the receiver can feed back ACK/NACK after the SF 6. In this case, the ACK/NACK transmitted by the receiver may be a feedback for a transmission result of the RV 21 or a feedback for a transmission result of the RV 21 combined with the RV 20.

According to a result of receiving the ACK/NACK from the receiver, the transmitter can perform retransmission for the HARQ process #0 on the SF 0 and the SF 1 of the frame n+1. The transmitter can perform retransmission for the HARQ processes #2 on the SF 2, the SF 3, and the SF 4 of the frame n+1.

Figure 23:
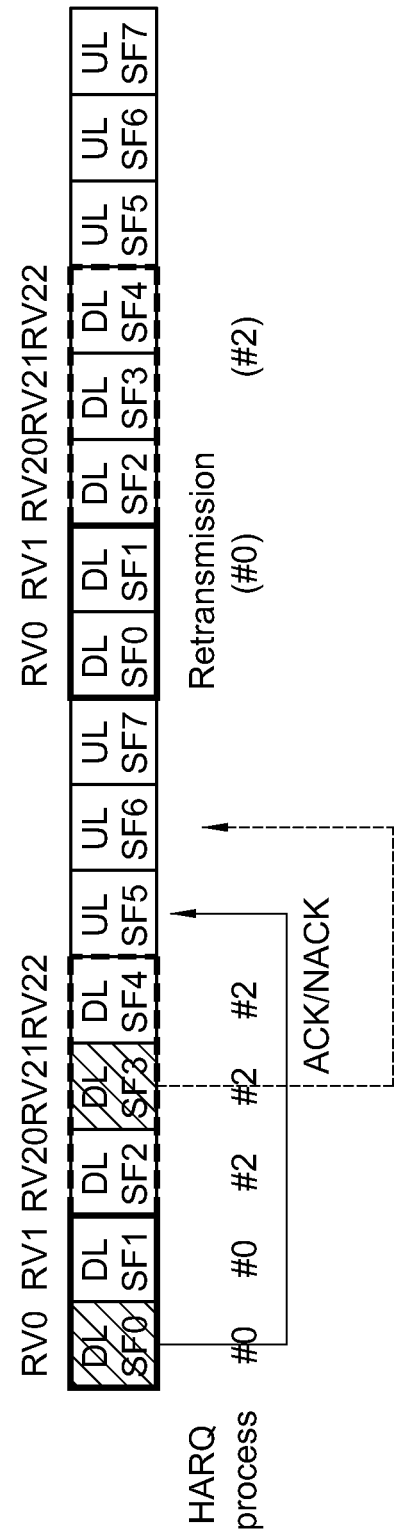

Referring to FIG. 23, for the HARQ process #0, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since the SF 5, the SF 6, and the SF 7 are UL subframes, the receiver can transmit the ACK/NACK to the transmitter on the SF 5. For the HARQ process #2, the receiver performs CRC detection on the RV 21. Since a processing delay is 2 subframes, the receiver can feed back ACK/NACK after the SF 6. In this case, the ACK/NACK transmitted by the receiver may be a feedback for a transmission result of the RV 21 or a feedback for a transmission result of the RV 21 combined with the RV 21.

According to a result of receiving the ACK/NACK from the receiver, the transmitter can perform retransmission for the HARQ process #0 on the SF 0 and the SF 1 of the frame n+1. The transmitter can perform retransmission for the HARQ processes #2 on the SF 2, the SF 3, and the SF 4 of the frame n+1.

Figure 24:
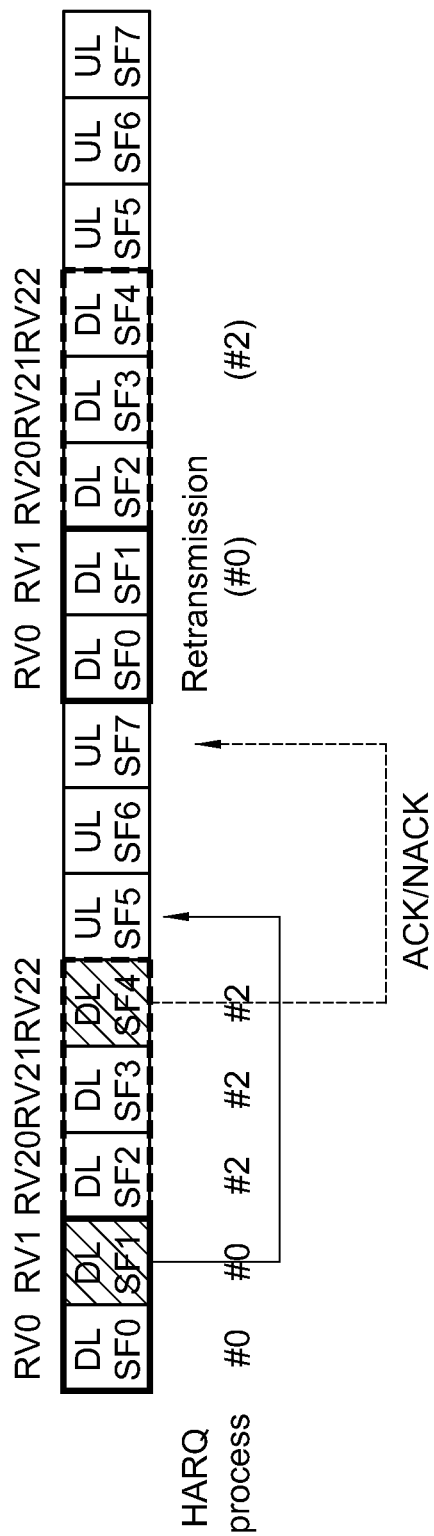

Referring to FIG. 24, for the HARQ process #0, the receiver performs CRC detection on the RV 1. Since a processing delay is 2 subframes, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since the SF 5, the SF 6, and the SF 7 are UL subframes, the receiver can transmit the ACK/NACK to the transmitter on the SF 5. For the HARQ process #2, the receiver performs CRC detection on the RV 22. Since a processing delay is 2 subframes, the receiver can feed back ACK/NACK after the SF 7. In this case, the ACK/NACK transmitted by the receiver may be a feedback for a transmission result of the RV 22 or a feedback for a transmission result of the RV 22 combined with the RV 20.

According to a result of receiving the ACK/NACK from the receiver, the transmitter can perform retransmission for the HARQ process #0 on the SF 0 and the SF 1 of the frame n+1. The transmitter can perform retransmission for the HARQ processes #2 on the SF 2, the SF 3, and the SF 4 of the frame n+1.

Figure 25:
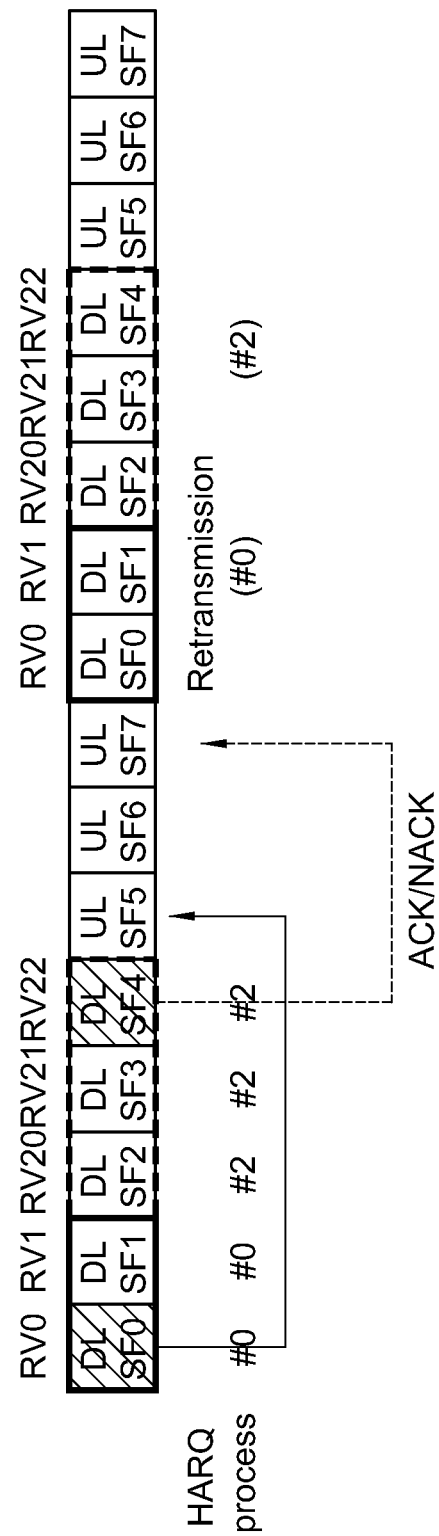

Referring to FIG. 25, for the HARQ process #0, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since the SF 5, the SF 6, and the SF 7 are UL subframes, the receiver can transmit the ACK/NACK to the transmitter on the SF 5. For the HARQ process #2, the receiver performs CRC detection on the RV 22. Since a processing delay is 2 subframes, the receiver can feed back ACK/NACK on the SF 7. In this case, the ACK/NACK transmitted by the receiver may be a feedback for a transmission result of the RV 22 or a feedback for a transmission result of the RV 22 combined with the RV 20.

According to a result of receiving the ACK/NACK from the receiver, the transmitter can perform retransmission for the HARQ process #0 on the SF 0 and the SF 1 of the frame n+1. The transmitter can perform retransmission for the HARQ processes #2 on the SF 2, the SF 3, and the SF 4 of the frame n+1.

FIG. 26 to FIG. 31 shows HARQ timing according to an embodiment of the present invention. An HARQ process #0 configures three subframes as one TTI. An HARQ process #3 configures two consecutive subframes as one TTI. To perform the HARQ process #0, a transmitter transmits an RV 0 on an SF 0 of a frame n, transmits an RV 1 on an SF 1, and transmits an RV 2 on an SF 2. To perform the HARQ process #3, the transmitter transmits an RV 30 on an SF 3 of the frame n, and transmits an RV 31 on an SF 4. A receiver feeds back ACK/NACK for data packet transmission of the HARQ process #0 and the HARQ process #3 to the transmitter. According to a result of receiving the ACK/NACK from the receiver, the transmitter can perform retransmission for the HARQ process #0 on an SF 0, an SF 1, and an SF 2 of a frame n+1. The transmitter can perform retransmission for the HARQ processes #3 on an SF 3 and an SF 4 of the frame n+1.

Figure 26:
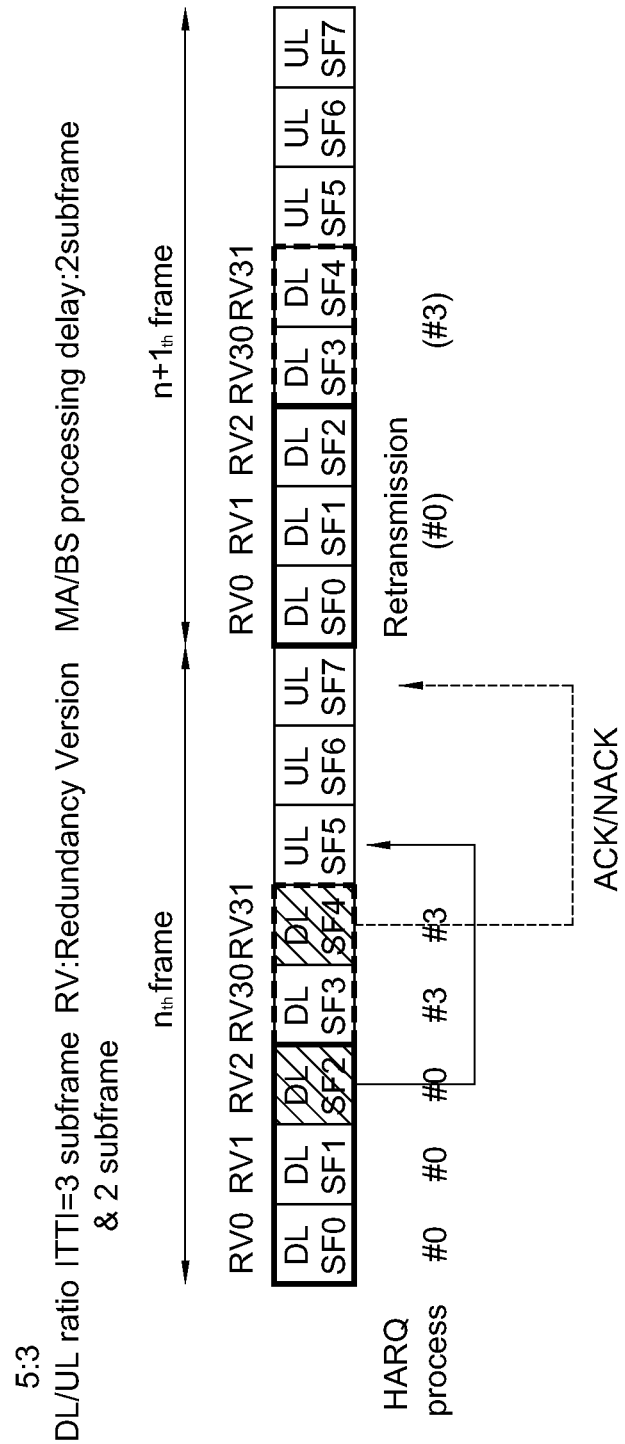
FIG. 26 to FIG. 31 shows HARQ timing according to an embodiment of the present invention.

Referring to FIG. 26, for the HARQ process #0, the receiver performs CRC detection on the RV 2. Since a processing delay is 2 subframes, the receiver can feed back ACK/NACK on an SF 5. In this case, the ACK/NACK transmitted by the receiver may be a feedback for a transmission result of the RV 2 or a feedback for a transmission result of the RV 2 combined with the RV 0. For the HARQ process #3, the receiver performs CRC detection on the RV 31. Since a processing delay is 2 subframes, the receiver can feed back ACK/NACK on an SF 7. In this case, the ACK/NACK transmitted by the receiver may be a feedback for a transmission result of the RV 31 or a feedback for a transmission result of the RV 31 combined with the RV 30.

Figure 27:
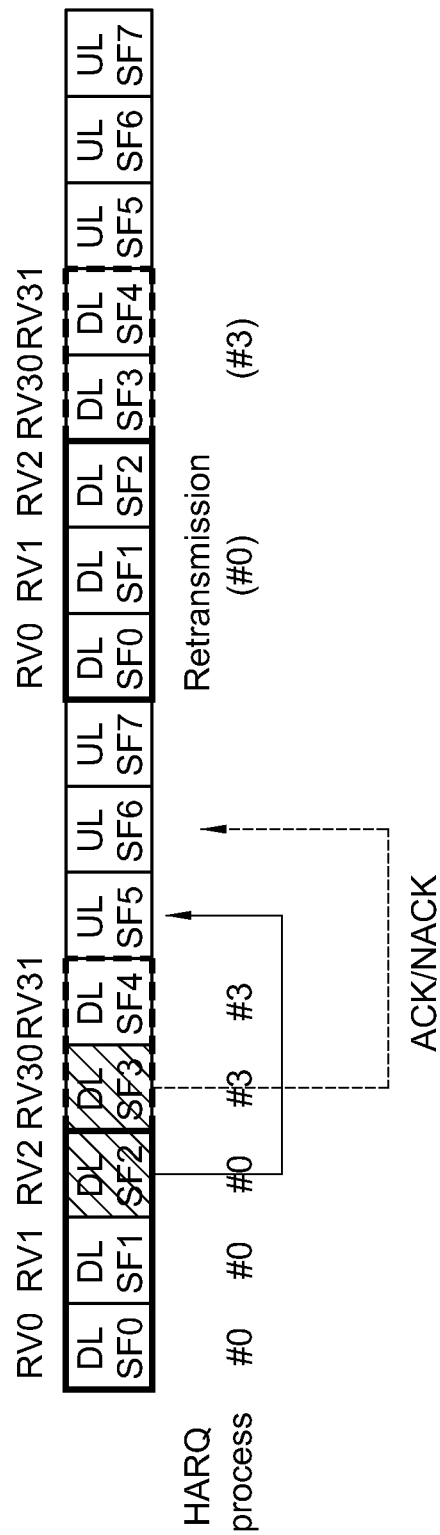

Referring to FIG. 27, for the HARQ process #0, the receiver performs CRC detection on the RV 2. Since a processing delay is 2 subframes, the receiver can feed back ACK/NACK on the SF 5. In this case, the ACK/NACK transmitted by the receiver may be a feedback for a transmission result of the RV 2 or a feedback for a transmission result of the RV 2 combined with the RV 0. For the HARQ process #3, the receiver performs CRC detection on the RV 30. Since a processing delay is 2 subframes, the receiver can feed back ACK/NACK on an SF 6. In this case, the ACK/NACK transmitted by the receiver may be a feedback for a transmission result of the RV 30.

Figure 28:
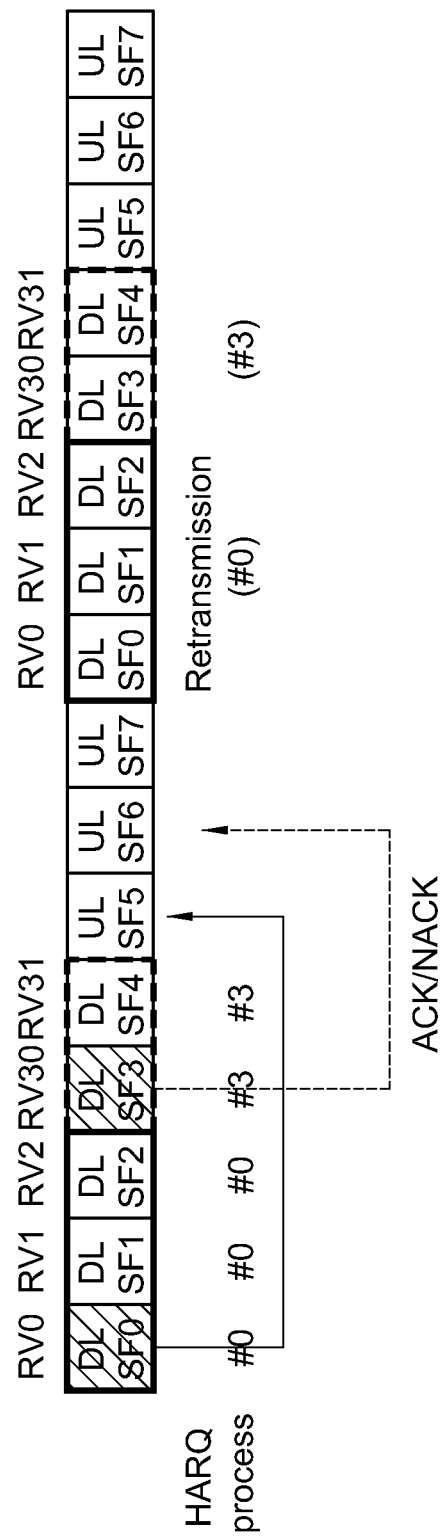

Referring to FIG. 28, for the HARQ process #0, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since the SF 5, the SF 6, and the SF 7 are UL subframes, the receiver can transmit the ACK/NACK to the transmitter on the SF 5. In this case, the ACK/NACK transmitted by the receiver may be a feedback for a transmission result of the RV 0. For the HARQ process #3, the receiver performs CRC detection on the RV 30. Since a processing delay is 2 subframes, the receiver can feed back ACK/NACK on the SF 6. In this case, the ACK/NACK transmitted by the receiver may be a feedback for a transmission result of the RV 30.

Figure 29:
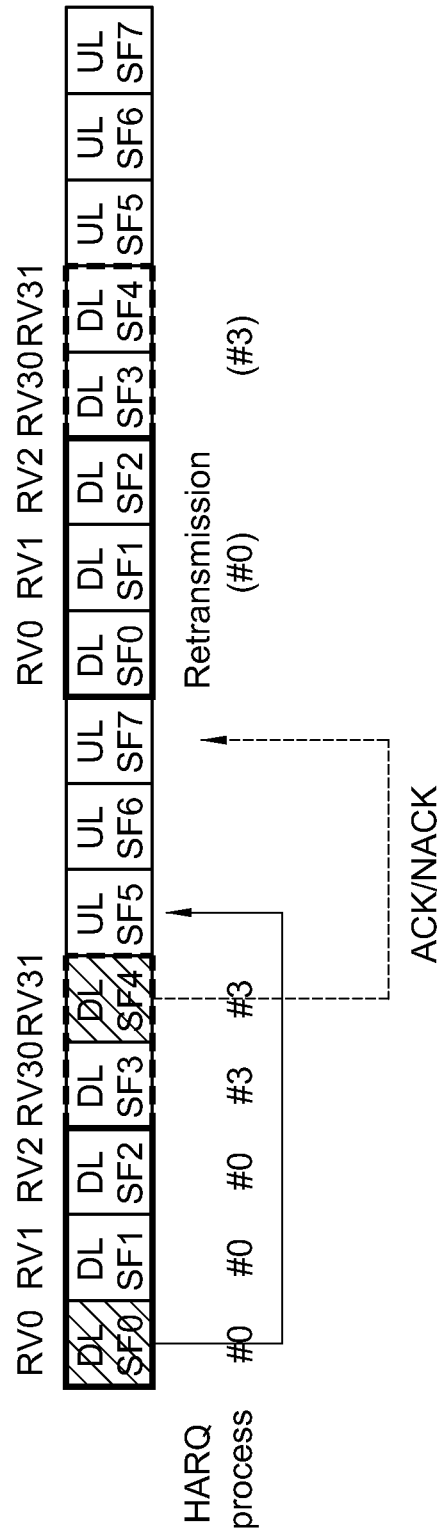

Referring to FIG. 29, for the HARQ process #0, the receiver performs CRC detection on the RV 0. Since a processing delay is 2 subframes, the receiver can feed back ACK/NACK with an interval of at least 2 subframes from a transmission time of the RV 0. That is, since the transmission time of the RV 0 is the SF 0, the receiver can feed back the ACK/NACK after the SF 3. However, since the SF 5, the SF 6, and the SF 7 are UL subframes, the receiver can transmit the ACK/NACK to the transmitter on the SF 5. In this case, the ACK/NACK transmitted by the receiver may be a feedback for a transmission result of the RV 0. For the HARQ process #3, the receiver performs CRC detection on the RV 31. Since a processing delay is 2 subframes, the receiver can feed back ACK/NACK on the SF 7. In this case, the ACK/NACK transmitted by the receiver may be a feedback for a transmission result of the RV 31 or a feedback for a transmission result of the RV 31 combined with the RV 30.

Figure 30:
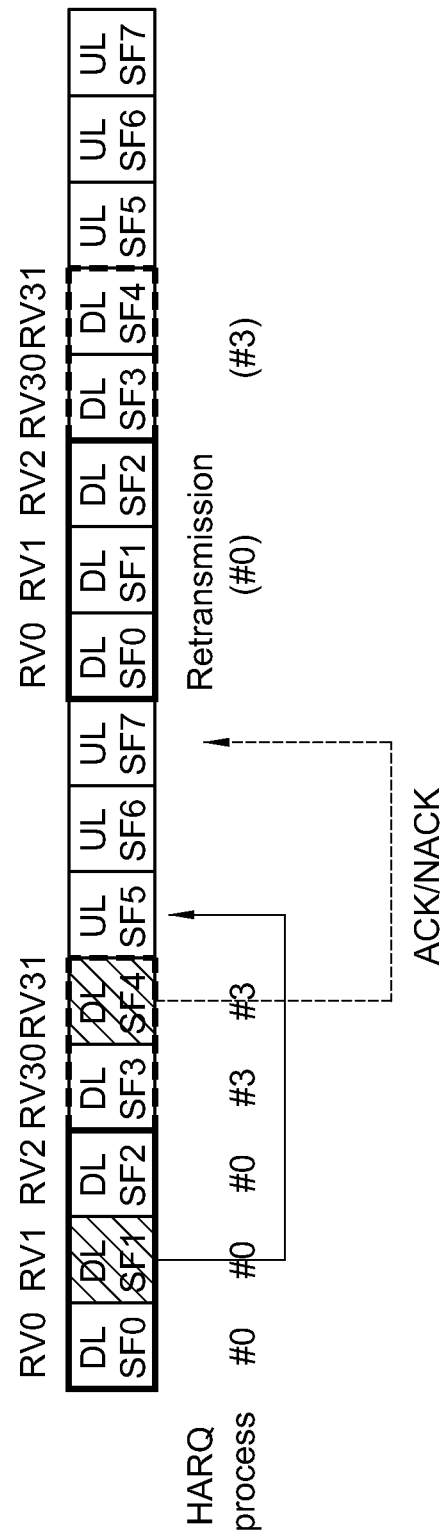

Referring to FIG. 30, for the HARQ process #0, the receiver performs CRC detection on the RV 1. Since a processing delay is 2 subframes, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since the SF 5, the SF 6, and the SF 7 are UL subframes, the receiver can transmit the ACK/NACK to the transmitter on the SF 5. In this case, the ACK/NACK transmitted by the receiver may be a feedback for a transmission result of the RV 1 or a feedback for a transmission result of the RV 1 combined with the RV 0. For the HARQ process #3, the receiver performs CRC detection on the RV 31. Since a processing delay is 2 subframes, the receiver can feed back ACK/NACK on the SF 7. In this case, the ACK/NACK transmitted by the receiver may be a feedback for a transmission result of the RV 31 or a feedback for a transmission result of the RV 31 combined with the RV 30.

Figure 31:
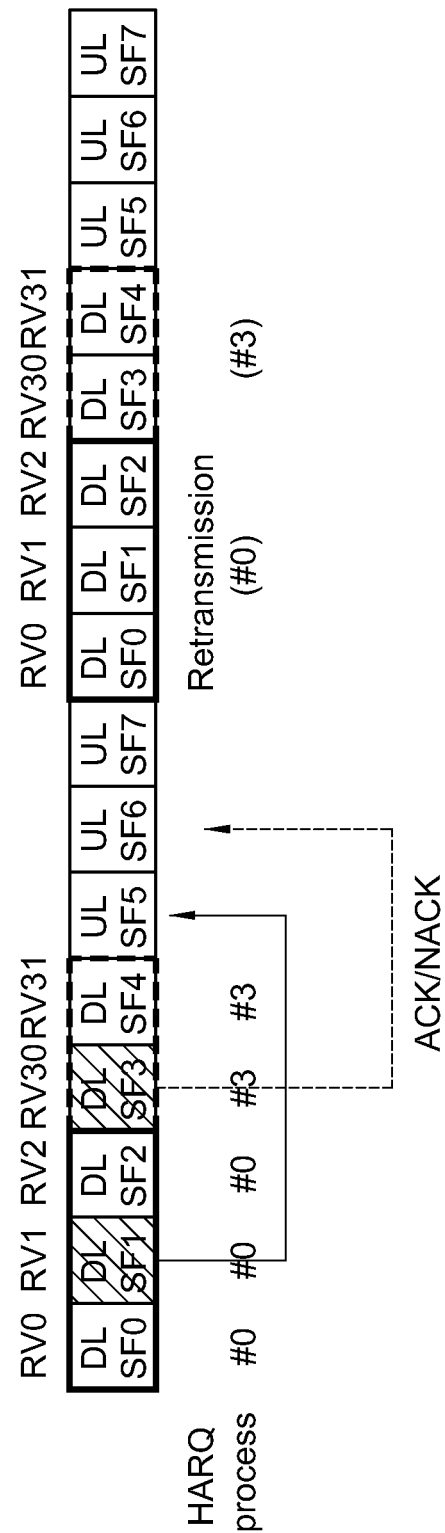

Referring to FIG. 31, for the HARQ process #0, the receiver performs CRC detection on the RV 1. Since a processing delay is 2 subframes, the receiver can feed back ACK/NACK with an interval of at least 2 subframes from a transmission time of the RV 1. That is, since the transmission time of the RV 1 is the SF 1, the receiver can feed back the ACK/NACK after the SF 4. However, since the SF 5, the SF 6, and the SF 7 are UL subframes, the receiver can transmit the ACK/NACK to the transmitter on the SF 5. In this case, the ACK/NACK transmitted by the receiver may be a feedback for a transmission result of the RV 1 or a feedback for a transmission result of the RV combined with the RV 0. For the HARQ process #3, the receiver performs CRC detection on the RV 30. Since a processing delay is 2 subframes, the receiver can feed back ACK/NACK on the SF 6. In this case, the ACK/NACK transmitted by the receiver may be a feedback for a transmission result of the RV 30.

Figure 32:
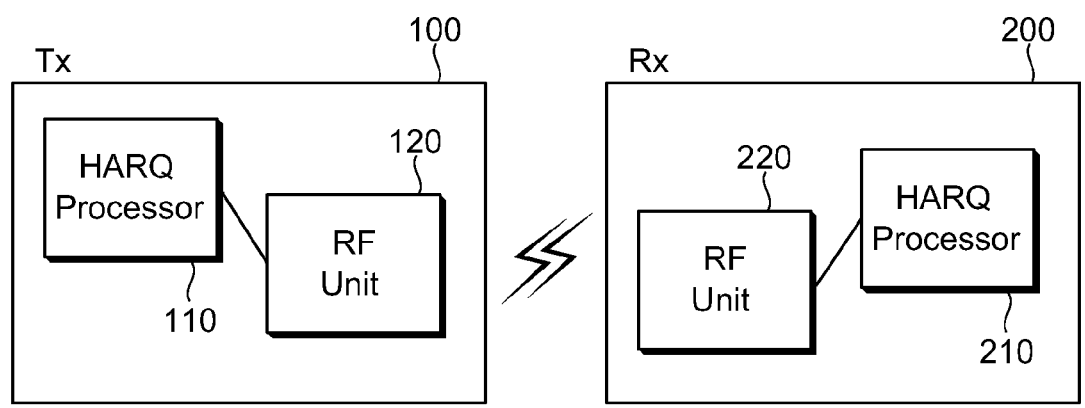
FIG. 32 is a block diagram showing a transmitter and a receiver for transmitting and receiving data by using a method of performing HARQ according to an embodiment of the present invention.

FIG. 32 is a block diagram showing a transmitter and a receiver for transmitting and receiving data by using a method of performing HARQ according to an embodiment of the present invention.

Referring to FIG. 32, a transmitter (Tx) 100 includes an HARQ processor 110 and a radio frequency (RF) unit 120, and a receiver (Rx) 200 includes an HARQ processor 210 and an RF unit 220. The RF units 120 and 220 are respectively connected to the HARQ processors 110 and 210 to transmit and receive radio signals. The HARQ processor 110 of the transmitter 100 transmits data in a TTI unit consisting of a plurality of consecutive subframes. The HARQ processor 210 of the receiver 200 identifies ACK/NACK for the received data.

According to the present invention, there is provided a method of performing hybrid automatic repeat request (HARQ) when a plurality of subframes constitute one transmission time interval (TTI). Therefore, HARQ latency can be reduced, and acknowledgement (ACK)/non-acknowledgement (NACK) can be transmitted within one frame. In addition, an overhead of a user equipment (UE) can be reduced.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of performing hybrid automatic repeat request (HARQ) of a receiver in a wireless communication system, the method comprising:
   receiving data using a plurality of redundancy versions (RVs) in a transmission time interval (TTI) unit comprising a plurality of consecutive subframes, each of the plurality of RVs being allocated to a corresponding one of the plurality of consecutive subframes; and
   transmitting an acknowledgment (ACK)/non-acknowledgment (NACK) for the received data,
   wherein:
   the ACK/NACK is transmitted with an interval of a predetermined processing delay from a transmission time of a specific redundancy version (RV) among the plurality of RVs;
   the ACK/NACK is based on an error detection result of the specific RV only or based on an error detection result of the specific RV combined with at least one RV received before the specific RV; and
   the specific RV is a front-most RV in a time domain among the plurality of RVs.

2. The method of claim 1, wherein the specific RV is attached with a cyclic redundancy check (CRC) to identify the ACK/NACK.

3. A method of performing hybrid automatic repeat request (HARQ) of a transmitter in a wireless communication system, the method comprising:
   transmitting data using a plurality of redundancy versions (RVs) in a transmission time interval (TTI) unit comprising a plurality of consecutive subframes, each of the plurality of RVs being allocated to a corresponding one of the plurality of consecutive subframes;
   receiving an acknowledgment (ACK)/non-acknowledgment (NACK) for the transmitted data;
   determining whether the data is successfully received by a receiver; and
   retransmitting the data according to the determination result,
   wherein:
   the ACK/NACK is transmitted with an interval of a predetermined processing delay from a transmission time of a specific redundancy version (RV) among the plurality of RVs;
   the ACK/NACK is based on an error detection result of the specific RV only or based on an error detection result of the specific RV combined with at least one RV received before the specific RV; and
   the specific RV is a front-most RV in a time domain among the plurality of RVs.

4. The method of claim 3, wherein determining whether the data is successfully received by the receiver is based on whether the ACK/NACK is received for the specific RV among the plurality of RVs.

5. The method of claim 4, wherein the specific RV is attached with a cyclic redundancy check (CRC) to identify the ACK/NACK.

6. The method of claim 4, wherein the data is retransmitted with an interval of a predetermined processing delay from a transmission time of the NACK for the specific RV.

* * * * *